United States Patent [19]

Masumoto

[11] Patent Number: 4,979,040
[45] Date of Patent: Dec. 18, 1990

[54] DECODER FOR SUBSAMPLED VIDEO SIGNAL

[75] Inventor: Takahiko Masumoto, Osaka, Japan

[73] Assignee: Sanyo Electric Co., Ltd., Kawasaki, Japan

[21] Appl. No.: 466,522

[22] Filed: Jan. 17, 1990

[30] Foreign Application Priority Data

Jan. 18, 1989 [JP] Japan .................................. 1-10320

[51] Int. Cl.⁵ ............................................ H04N 9/64
[52] U.S. Cl. ..................................... 358/138; 358/13; 358/133
[58] Field of Search .................... 358/138, 12, 13, 135, 358/136, 133

[56] References Cited

U.S. PATENT DOCUMENTS 4,692,801 9/1987 Ninomiya et al. .
4,873,573 10/1989 Thomas ............................... 358/138
4,882,613 11/1989 Masumoto ........................... 358/138
4,891,699 1/1990 Hamada ............................... 358/136

FOREIGN PATENT DOCUMENTS 62-189886 8/1987 Japan .

OTHER PUBLICATIONS

"MUSE: Transmission System of High Vision Broadcast via Satellite", Nikkei Electronics, Nov. 2, 1987, pp. 189–212.

Primary Examiner—Howard W. Britton
Attorney, Agent, or Firm—Armstrong, Nikaido, Marmelstein, Kubovcik & Murray

[57] ABSTRACT

Disclosed is an intrafield interpolation circuit for interpolating pixel signals between pixel signals sampled based on Multiple Sub-nyquist Sampling Encoding (MUSE). There are provided in this interpolation circuit switches (S4a, S4b, S4c) for selecting pixel signals from delay elements (33h, 33i, 33j). Since these switches are controlled at a suitable timing, correct pixel signals obtained by an operation are interpolated between the sampled pixel signals. In addition, since pixel signals required only for an interpolation processing are handled, multipliers require half the operation speed of a conventional circuit, resulting in an enhanced reliability in operation.

18 Claims, 18 Drawing Sheets

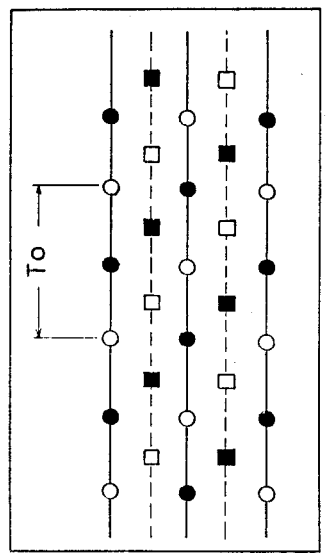
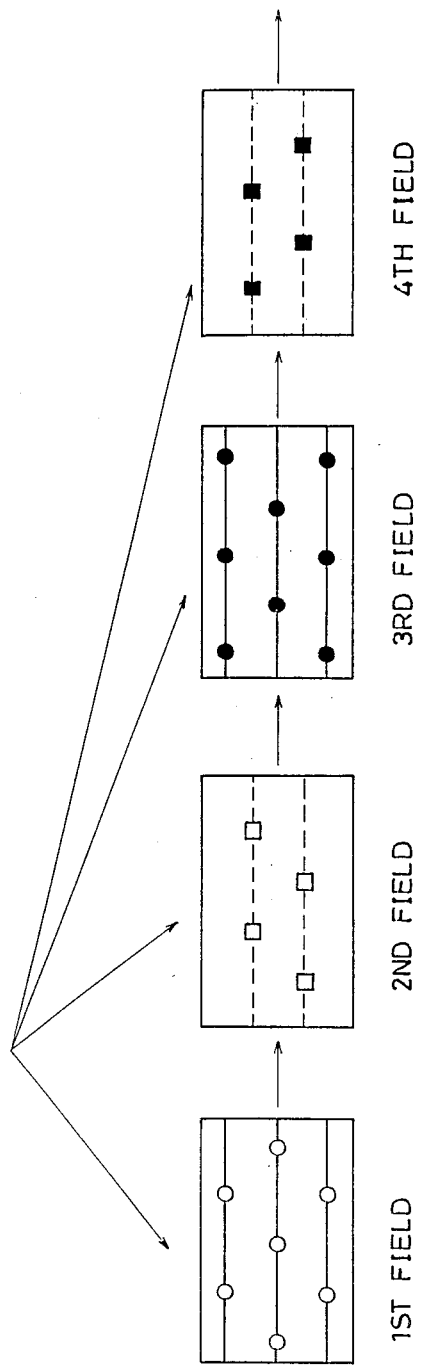
FIG.1 PRIOR ART

FIG.9A
PRIOR ART
FIG.9B
PRIOR ART
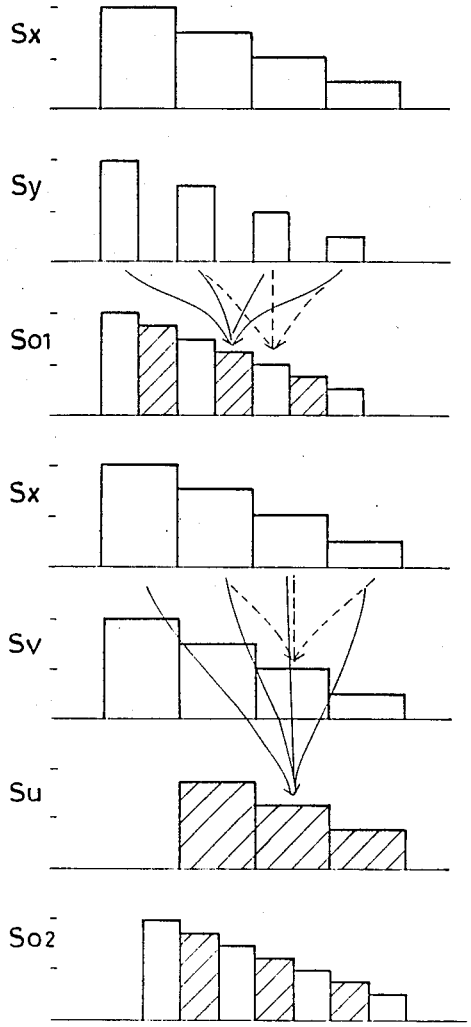
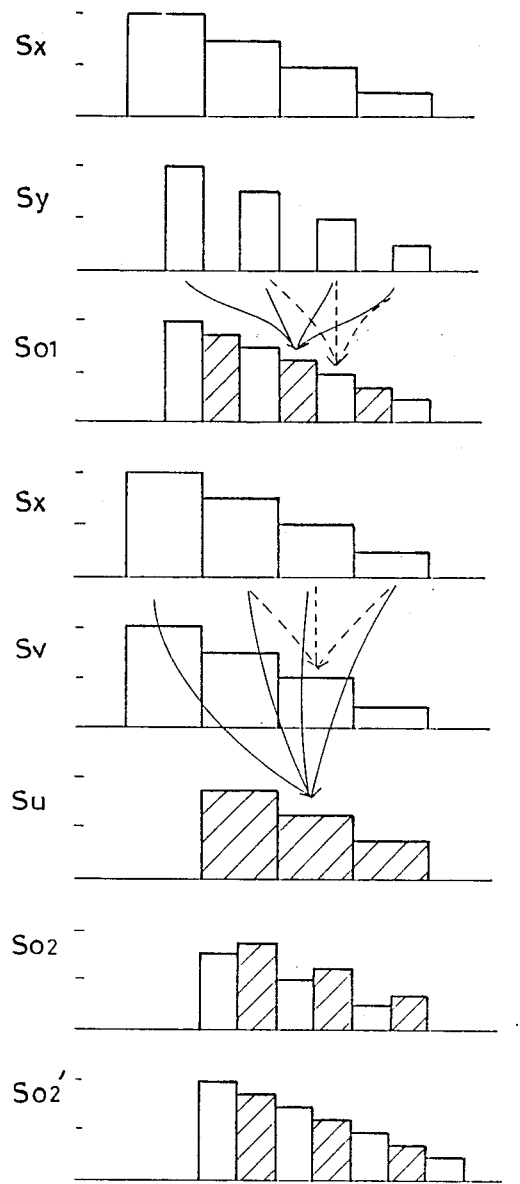

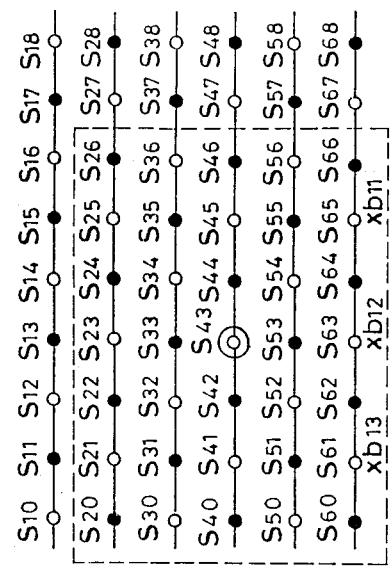
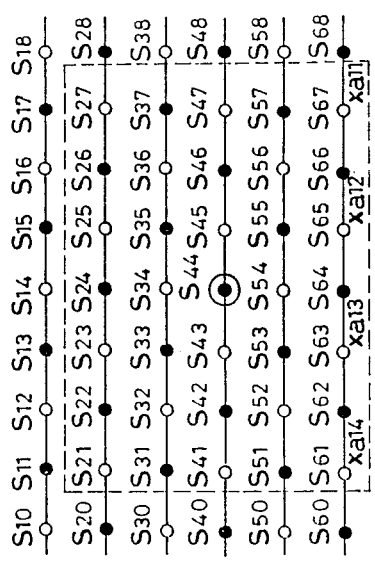
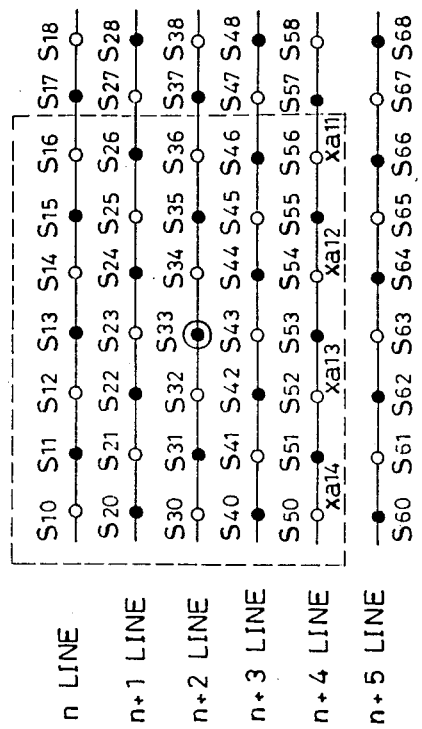
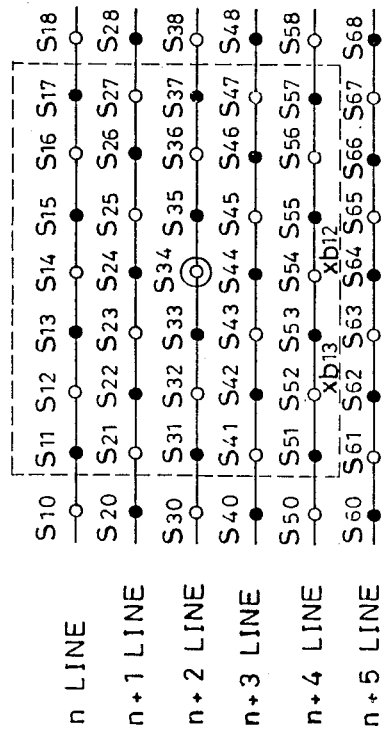
FIG.10C

DECODER FOR SUBSAMPLED VIDEO SIGNAL

BACKGROUND OF THE INVENTION

1. Field of the Invention

The present invention relates generally to decoders for subsampled video signals, and more particularly to a decoder for a sub-sampled video signal which is band compressed by interline offset subsampling. This invention has particular applicability to a MUSE decoder for a video signal which is band compressed based on Multiple Sub-nyquist Sampling Encoding (hereinafter referred to as MUSE). This invention relates more particularly to an improvement in an intrafield interpolation circuit for decoding a motion picture provided in the MUSE decoder.

2. Description of the Background Art

Various television broadcastings for transmitting high-quality video have been proposed in recent years. Nippon Hoso Kyokai (NHK) in Japan has proposed a high-definition television system called High-vision. According to the standard of this high vision, the number of scanning lines is 1125, a field frequency is 60 Hz, an interlace ratio is 2:1, and a length-to-breadth ratio of a picture is 9:16. A baseband signal of this high vision signal has a bandwidth of 22 MHz for a luminance signal and 7 MHz for each of two color difference signals (R−Y, B−Y).

Since the high vision signal includes signal components of a wide band, it cannot be transmitted as it is by using a bandwidth (27 MHz) on one channel of an usual satellite broadcasting. Therefore, NHK has proposed a band compressed transmission system for converting the high vision signal into an 8 MHz signal. This band compressed transmission system is called Multiple Sub-nyquist Sampling Encoding (MUSE system). An application of this MUSE system enables the bandwidth of the high vision signal to be compressed to 8 MHz and thus be transmitted on one channel band of the satellite broadcasting. A general description concerning with the MUSE system is disclosed, for example, in U.S. Pat. No. 4,692,811 assigned to Ninomiya et al on Sept. 8, 1987. In addition, another description with the MUSE system is found in an article entitled "MUSE: Transmission System of High Vision Broadcast via Satellite" in Nikkei Electronics, Nov. 2, 1987, pp. 189–212. As described in those articles, it is noticed that the MUSE system is a band compression technology employing correlation properties of a video signal.

FIG. 1 shows sampling points of the high vision signal and those points in each field thereof. In this figure, marks of a hollow circle (○), a hollow square (□), a solid circle (●) and a solid square (■) represent sampling points in the 4n-th, the (4n+1)-th, the (4n+2)-th and the (4n +3)-th fields, respectively. T₀ represents a sampling interval, which corresponds to the reciprocal of a transmission sampling rate (16.2 MHz). In sampling the high vision signal, a sampling phase is offset between any fields, any frames and any lines so that the sampling points do not overlap one another between fields, frames and between lines. That is, the sampling phase is controlled so as to be circulated every four fields, so that a MUSE signal is generated by sampling of the high vision signal.

A MUSE decoder for decoding this MUSE signal to the original high vision signal carries out different processings for a signal in a still picture portion and a signal in a motion picture portion.

In the processing of the still picture portion, since a picture has a correlation between any fields and between any frames, a pixel which is lacking between any pixels being transmitted at present is interpolated based on a pixel one field before, a pixel one frame before and a pixel three fields before. That is, a video in the still picture portion is reproduced based on the MUSE signal to be inputted during the four-field period.

Meanwhile, in the processing of the signal in the motion picture portion, there exists no correlation with time, i.e., no correlation between any fields and between any frames. Thus, a reproduction is carried out only with pixel data at a sampling point in the field, which is being transmitted at present. In addition, the pixel lacking between the pixels being transmitted at present is interpolated utilizing a correlation between lines, namely, pixels on at least the upper and lower lines.

The signal processing in the conventional MUSE decoder as described above will now be described with reference to FIGS. 2 and 3. FIG. 2 shows a MUSE signal transmission system, and FIG. 3 is a schematic diagram of the MUSE decoder, which is simplified to facilitate the description thereof.

Referring to FIG. 3, the MUSE decoder comprises a MUSE signal input terminal 10, an 8.15 MHz low-pass filter 11, an A/D converter 12 for sampling pixel data in response to a clock signal of 16.2 MHz, a still picture processing circuit 13, a motion picture processing circuit 17, a motion detecting circuit 20, a mixing circuit 21, a TCI decoder 22, and a synchronization/control signal detection circuit 23. The still picture processing circuit 13 comprises an interframe interpolation circuit 14, a sampling frequency converting circuit 15, and an interfield interpolation circuit 16. The motion picture processing circuit 17 comprises an intrafield interpolation circuit 18 and a sampling frequency converting circuit 19.

The mixing circuit 21 mixes a signal from the still picture processing circuit 13 and a signal from the motion picture processing circuit 17. A mixing ratio thereof varies depending on the amount of motion of a video detected by the motion detection circuit 20. A high vision signal is outputted through the TCI decoder 21. The synchronization/control signal detection circuit 23 carries out (a) detecting a horizontal/vertical synchronizing signal, (b) generating clock signals with various frequencies (16.2 MHz, 32.4 MHZ, 48.6 MHz and the like), (c) detecting control signals having motion vector data or the like shown in Table 1 in the following, and (d) generating a control signal and a clock signal of each circuit based on the detection of those control signals.

TABLE 1

| BIT NO. | CONTENT OF CONTROL | |
|---|---|---|
| 1 | Interfield subsampling phase (Y) | (1: when sampling points are on the right) |
| 2 | Horizontal motion vector (2') | (Positive: when the picture shifts to the right) |
| 3 | #2, LSB | |
| 4 | ICK unit of 32 MHz | |
| 5 | | |
| 6 | Vertical motion vector (2') | (Positive: when the picture shifts downwards) |
| 7 | #6, LSB | |
| 8 | Line unit | |
| 9 | Y subsampling phase | (1: when sampling points |

TABLE 1-continued

| BIT NO. | CONTENT OF CONTROL | |
|---|---|---|
| 10 | C subsampling phase | are on the right on odd number lines) (1: when the value of line #2 (fraction is discarded) is an odd number and sampling points are on the left) |
| 11 | Noise reduction is carried out in response to the value of | |
| 12 | noise reduction control | |
| 13 | Interlace flag | |
| 14 | Motion detection sensitivity control (1) | (1: when the lower sensitivity is selected) |
| 15 | Motion detection sensitivity control (2) | |
| 16 | | 0: normal |
| 17 | Motion information | 1: completely still picture 2: not completely still picture |
| 18 | | 3~7: the degree of motion |
| 19 | None | |
| 20 | AM/FM | (1: AM, no emphasis) |
| 21 ∫ 32 | Spare | |

After the MUSE signal inputted is converted to digital data by the A/D converter 12, the still picture processing circuit 13 and the motion picture processing circuit 17 carry out decoding for a still picture and a motion picture, respectively. Output signals from these circuits 13 and 17 are mixed together at the mixing circuit 21 depending on the amount of motion detected by the motion detection circuit 20. An output signal of this mixing circuit 21 is applied to the TCI decoder 22, so that the TCI decoder 22 outputs a high vision signal.

FIG. 4 shows one example of the interframe interpolation circuit 14 and the intrafield interpolation circuit 18 in the conventional MUSE decoder. In this example, the processing at the intrafield interpolation circuit 18 is time-consuming. Therefore, in order to correct a large deviation between the timings of signals in the still picture processing circuit 13 and the motion picture processing circuit 17, an output signal of the interframe interpolation circuit 14 is delayed through one-line memories 24a and 24b in the intrafield interpolation circuit 18, so that a signal, the timing of which is controlled by this delay, is outputted to the sampling frequency converting circuit 15.

Referring to FIG. 4, a pixel signal Sa in the present field as shown in FIG. 5 is inputted into a terminal a of a switch S1 for interframe interpolation. Meanwhile, a signal Sb in which pixel signals ○ two frames before are interpolated between pixel signals ● one frame before as shown in FIG. 5, is inputted into the other terminal b of the switch S1. The switch S1 operates responsive to an output signal from an EXOR circuit 39 to output a signal Sc in which the pixel signals ○ included in the signal Sa are interpolated between the pixel signals ● one frame before in place of the pixel signals ○ two frames before. A frame memory 26 for delaying the input signal Sc by approximately one frame period is provided in the interframe interpolation circuit 14. The frame memory 26 comprises field memories 27 and 28 each constituting one field delay circuit. This one-field memory 28 has its delay time controlled responsive to a motion vector signal in order to correct a motion vector.

A motion detecting circuit 20' receives the respective signals in the present frame, one frame before and two frames before. As mentioned above, since the sampling points of the MUSE signal are circulated every two frames (four fields), the motion detecting circuit 20, detects a motion by comparing the pixel signals in the present frame and those two frames before (the detection of the difference in motion between every two frames). Since the motion detection is incomplete only by detecting the difference between every two frames, the detection circuit 20' also detects a motion by comparing the pixel signals in the present frame with those one frame before. This motion detection between any frames is carried out by comparing signal components equal to or less than 4.2 MHz, which have no folding distortion generated by sub-sampling in the still picture. The signals, which represent the amount of motion detected by these two motion detecting operations, are applied to the mixing circuit 21, and the mixing ratio is controlled as described above.

The clock signal of 16.2 MHz is applied to the EX-OR circuit 39 through an input terminal 29. A phase control signal for interpolating the pixel signals in the present frame in place of the pixel signals two frames before by the switch S1 is applied to the EX-OR circuit 39 through the other terminal 30. This phase control signal is generated in the synchronization/control signal detecting circuit 23 in response to 9th bit data in a control signal and a horizontal/vertical synchronizing signal.

As is known, the intrafield interpolation circuit 18' of the MUSE decoder produces pixels lacking between the transmitted pixels by filtering and also filters the transmitted pixels, resulting in an enhancement in the degree of freedom in a frequency characteristic of a video signal. This intrafield interpolation circuit 18' comprises line memories 24a, 24b, 24c and 24d for one horizontal scanning period (1H) delay, switches S2a, S2b, S2c, S2d and S2e for selecting the pixel signals in the present frame and inserting a ground signal (0 signal) in place of the pixel signals one frame before, and one-dimensional transversal filters 32a, 32b, 32c, 32d and 32e. These one-dimensional transversal filters 32a-32e are identical in their configurations, but different from one another only in their tap coefficients a1-1-a54, b11-b53 to be set. The transversal filter 32a comprises delay elements 33a-33f for delaying by a time period corresponding to one pixel. Each of these unit delay elements 33a-33f is constituted by a D type flip-flop (D-FF). The transversal filter 32a further comprises multipliers 34a-34g to which different tap coefficient (a11, b11, a12, b12, a13, b13, a14) are provided, respectively. These multipliers 34a-34g are each in general constituted by an ROM. Outputs of all the multipliers 34a-34g are connected to an adder 35.

Outputs of all the one-dimensional transversal filters 32a-32e are connected to an adder 36. An output signal is outputted through a terminal 37 to the sampling frequency converting circuit 19 for motion picture signal processing. A signal is outputted along an output line L1 and through an output terminal 38 to the sampling frequency converting circuit 15 for still picture signal processing.

FIG. 6 shows an equivalent circuit of the intrafield interpolation circuit 18. Referring to FIG. 6, one switch S3 for inserting a 0 signal is provided equivalently at an input stage of the intrafield interpolation circuit 18'. That is, although only one 0 signal inserting switch S3 is required, two one-line memories (not shown) are separately required for controlling the timing of an output signal of the interframe interpolation circuit 14, namely for delaying by two horizontal scanning periods.

An operation of the intrafield interpolation circuit 18' will now be described with reference to FIGS. 4-7. In FIG. 7, pixels to be inputted are shown; the pixels in the present frame are denoted with hollow circles O, while pixels of the 0 signal obtained by grounding the switch S3 are denoted with the solid circles.

The intrafield interpolation circuit 18' interpolates pixel signals at the positions of the solid circles ● by two-dimensional filtering and also filters the pixels O in the present frame. This intrafield interpolation circuit 18' comprises a two-dimensional filter circuit in five rows in a vertical direction and in seven columns in a horizontal direction, as will be recognized by FIGS. 4 and 6. The switch S3 causes a 0 signal to be inserted in pixel signals ● other than the pixel signals O in the present frame.

The one-dimensional transversal filters 32a-32e and line memories 24a-24d operate responsive to a clock signal of 32.4 MHz. Thus, at the point when the present frame pixels O exist at the central position (CENTER) of FIG. 4 or FIG. 6, 0-inserted pixels ● are placed in the respective multipliers 34a, 34c, 34e, 34g and the like to which the tap coefficients a11-a54 are provided, respectively. Consequently, the filtering is carried out employing the tap coefficients b11-b53 at this time.

Meanwhile, at the point when 0-inserted pixels ● are placed at the central position (CENTER), the 0-inserted pixels ● are placed in the respective multipliers 34b, 34d, 34f and the like with the tap coefficients b11-b53, respectively. This means that the filtering is carried out employing the tap coefficients a11-a54.

For example, an operation for interpolating a 0-inserted pixel S33 ● of FIG. 7 is expressed as follows.

$$
\begin{aligned}
S33 = \ & (a14 \cdot S50 + a13 \cdot S52 + a12 \cdot S54 + a11 \cdot S56) + & (1) \\
& (a23 \cdot S41 + a22 \cdot S43 + a21 \cdot S45 + & (2) \\
& (a34 \cdot S30 + a33 \cdot S32 + a32 \cdot S34 + a31 \cdot S36 + & (3) \\
& (a43 \cdot S21 + a42 \cdot S23 + a41 \cdot S25 + & (4) \\
& (a54 \cdot S10 + a53 \cdot S12 + a52 \cdot S14 + a51 \cdot S16) & (5)
\end{aligned} \right\} (A)
$$

An operation for filtering a present frame pixel S34 is expressed as follows.

$$
\begin{aligned}
S34 = \ & (b13 \cdot S52 + b12 \cdot S54 + b11 \cdot S56 + & (6) \\
& (b24 \cdot S41 + b23 \cdot S43 + b22 \cdot S45 + b21 \cdot S47 + & (7) \\
& (b33 \cdot S32 + b32 \cdot S34 + b31 \cdot S36 + & (8) \\
& (b44 \cdot S21 + b43 \cdot S23 + b42 \cdot S25 + b41 \cdot S27 + & (9) \\
& (b53 \cdot S12 + b52 \cdot S14 + b51 \cdot S16) & (10)
\end{aligned} \right\} (B)
$$

In the above described intrafield interpolation processing, the switches S2a-S2e of FIG. 4 or the switch S3 of FIG. 6 operates, so that a 0 signal is inserted in the present frame pixels (denoted with the solid circles ● of FIG. 7.)

An operation speed (a frequency of a clock signal) of the circuit is 30 nsec (32.4 MHz), and thus the operation speed and operation responsiveness must be enhanced. In addition, since data of the 0-inserted pixels must also be delayed, increased capacities of the line memories 24a-24d are required. That is, in the conventional, since the operation speed of the intrafield interpolation circuit is high, RAMs constituting the delay line memories 24a-24d and ROMs constituting the tap coefficient multipliers 34a-34g should be operated at high speed. Capacities of the RAMs are also required to be increased.

It is strongly desirable to implement the intrafield interpolation circuit in IC for a practical application of the MUSE decoder. For this implementation in IC, an area occupied by a RAM portion requiring a large area is preferably reduced. Furthermore, the operation speed of the circuit is preferably decreased for enhancing the reliability of the interpolation processing. Therefore, it is desirable that the memory capacity and the operation speed are reduced in the intrafield interpolation circuit 18.

A circuit of FIG. 8A is known as a general intrafield interpolation circuit of a video signal. This intrafield interpolation circuit comprises, similarly to the circuit shown in FIG. 5, the switch S3 for 0 insertion. Further, a circuit shown in FIG. 8B is known as a general interpolation circuit which carries out an equivalent processing to the circuit in FIG. 8A and has lower operation speed and smaller memory capacity than the circuit in FIG. 8A.

Employing this circuit of FIG. 8B as the intrafield interpolation circuit of the MUSE decoder enables the operation speed of the intrafield interpolation circuit to be reduced. However, the MUSE signal is, as shown in FIG. 1, inverted in sampling phase between any lines and between any frames. Thus, timing should be adjusted in accordance with the characteristics of the MUSE signal which varies this sampling phase for the application of the circuit of FIG. 8B to the MUSE decoder.

This relationship will be described in more detail with reference to FIGS. 9A and 9B. Each of the signals shown in FIGS. 9A and 9B corresponds to a signal on each node in the circuits shown in FIGS. 8A and 8B. Comparing FIG. 9A with FIG. 9B, the sampling phase is different from each other as seen from a waveform of a signal Sy. When the circuit shown in FIG. 8A is employed, a preferable output signal So1 (a signal in which hatched signal portions are inserted) is obtained in either case of FIG. 9A or 9B. However, when the circuit shown in FIG. 8B is employed, a preferable output signal So2 is obtained in the case shown in FIG. 9A, while a non-preferable signal So2 is outputted in the case in FIG. 9B. This means that the circuit in FIG. 8B is applied as the intrafield interpolation circuit as it is. Even in the case that the circuit in FIG. 8B is employed, a signal So2' with a waveform shown in FIG. 9B should be outputted.

The prior art of particular interest to this invention is seen in Japanese Patent Laying-Open No. 62-189886, which discloses a subsampling filter circuit for the MUSE decoder. This subsampling filter circuit directly applies a circuit similar to the one shown in FIG. 8B, and hence it is noticed that the problems described in FIGS. 9A and 9B arise.

SUMMARY OF THE INVENTION

An object of this invention is to interpolate a correct pixel signal between pixel signals sub-sampled in a pixel signal interpolation device.

Another object of this invention is to interpolate a highly reliable pixel signal between sub-sampled pixel signals in a pixel signal interpolation device.

A further object of this invention is to carry out an operation for generating a pixel signal to be interpolated between sub-sampled pixel signals at lower speed in a pixel signal interpolation device.

A still further object of this invention is to reduce an area occupied on a semiconductor substrate by a pixel signal interpolation device.

Still another object of this invention is to reduce an area occupied on a semiconductor substrate by a line memory required for an intrafield interpolation operation in a MUSE decoder.

Briefly, a pixel signal interpolation device according to the present invention comprises m (an integer of 2 or more) cascaded delay elements for delaying sampled pixel signals in response to a predetermined clock signal, (m+1) first multipliers for multiplying each of (m+1) delayed pixel signals from the delay elements by a predetermined first tap coefficient, a first adder for adding output signals of the first multipliers, m second multipliers for multiplying each of m pixel signals by a predetermined second tap coefficient, a second adder for adding output signals of the second multipliers, a timing controller for relatively controlling output timings of the first and second adders in response to a position of a pixel signal to be interpolated, and a mixer for mixing output signals of the first and second adders the timings of which are controlled, in response to a clock signal.

In operation, since the output timings of the first and second adders are relatively controlled by the timing controller, a correct pixel signal is interpolated between the sampled pixel signals. In addition, since it is unnecessary to deal with pixel signals in which signals indicating 0 are alternately inserted, namely, it is possible to deal with only pixel signals required for an interpolation processing, an operation speed of the first and second multipliers becomes reduced half that in the conventional. Therefore, a correct multiplication processing is carried out, so that a highly reliable pixel signal to be interpolated is generated.

In a preferred embodiment, the timing controller comprises a selecting circuit for selecting the first or last m pixel signals out of the (m+1) pixel signals from the delay elements in response to the position of the pixel signal to be interpolated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a sampling diagram showing sampling points of pixels to be sampled based on a MUSE system;

FIGS. 9A and 9B are signal waveform diagrams for describing problems arisen when the interpolation processing circuit shown in FIG. 8B is applied to the MUSE decoder;

FIG. 10C is a conception diagram showing a range of pixel signals employed for an operation in the intrafield interpolation circuit in FIG. 10A;

DESCRIPTION OF THE PREFERRED EMBODIMENTS

Figure 5:
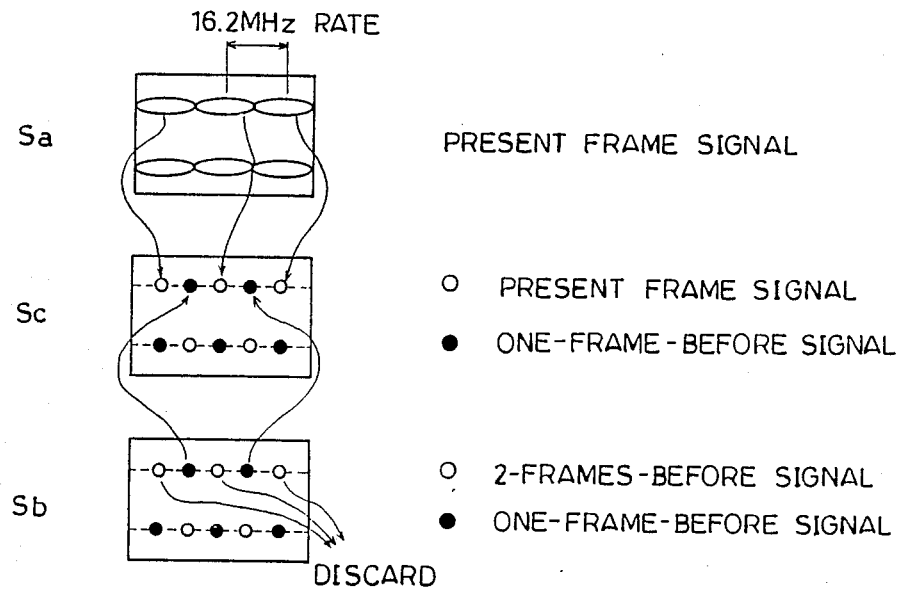
FIG. 5 is a signal processing diagram for describing an operation of the intrafield interpolation circuit shown in FIG. 4.
Figure 7:
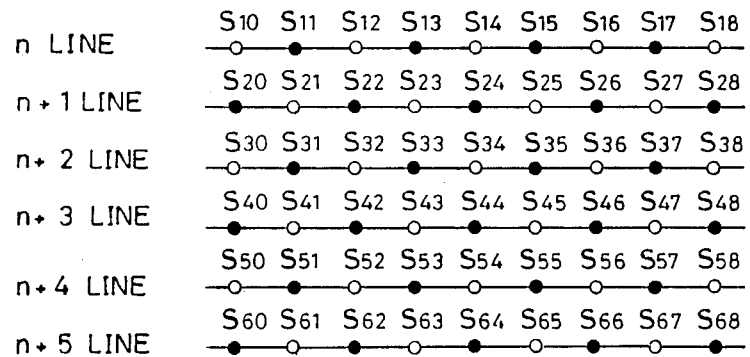
FIG. 7 is a conception diagram showing an arrangement of pixel signals on horizontal scanning lines.
Figure 8A:
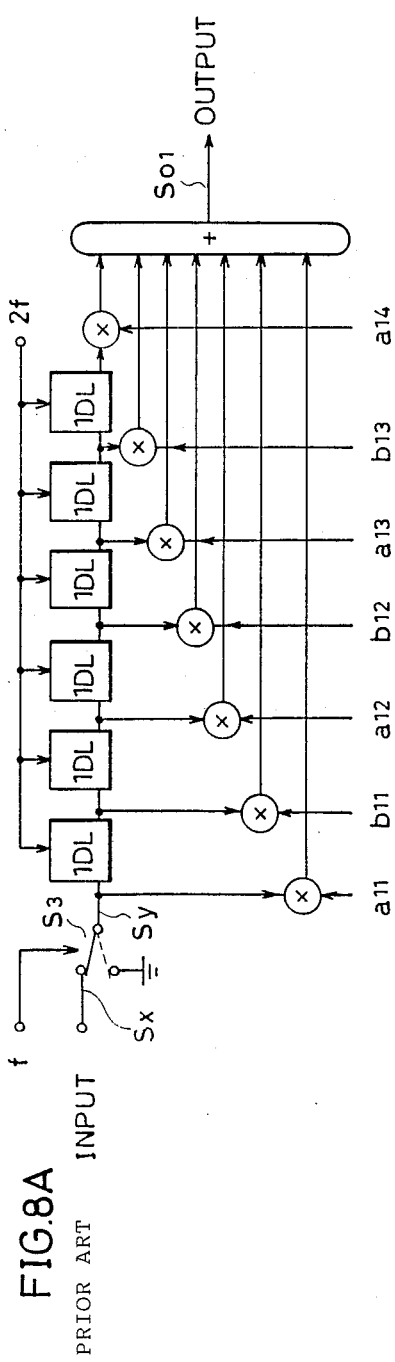
FIGS. 8A and 8B are circuit diagrams showing conventional and general interpolation processing circuits.
Figure 8B:
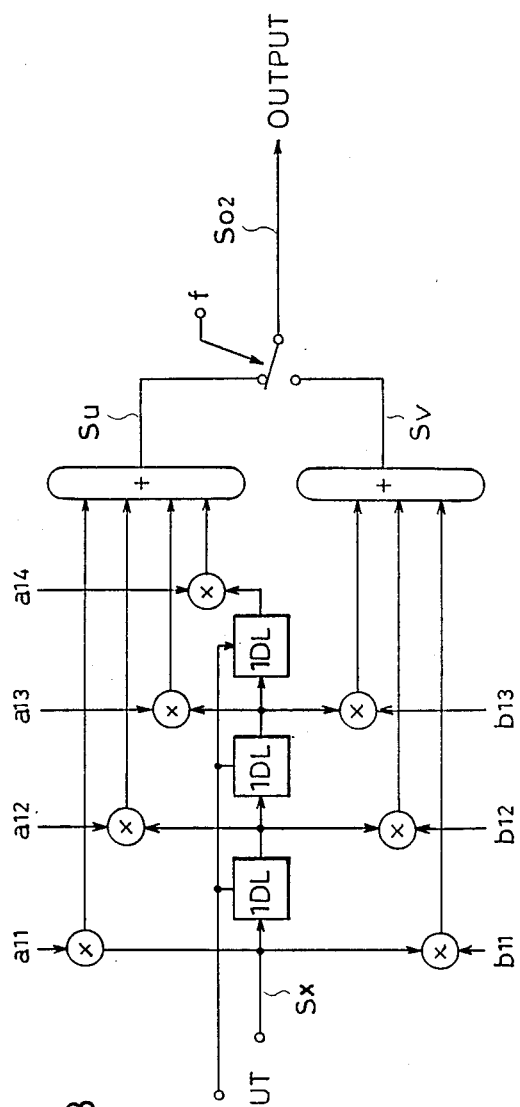

The first embodiment of the present invention will now be described with reference to FIGS. 10A-10D. Portions in FIG. 10A, corresponding to those shown in FIG. 5, are denoted with like reference numerals and designations. It is assumed in the following description that a signal denoted with a hollow circle shown in FIG. 7 is supplied as a pixel signal in the present frame through a terminal 25. The next pixel signal is supplied at the timing of a signal denoted with a solid circle ● in the next frame. A latch circuit 40 comprising a D type flip-flop (FF) latches only the pixel signal in the present frame (denoted with the hollow circle ○ in FIG. 7) and removes a pixel signal in the previous frame. An input signal Sa and an output signal Sd of this latch circuit 40 are shown in FIG. 10B. A latch circuit 41 comprising the D type-FF outputs a pixel signal whose timing is controlled as shown in FIG. 10B.

The pixel signal with the hollow circle ○ is a signal in the present frame in the above case. Meanwhile, in case that the pixel signal with the solid circle ● is the signal in the present frame, the latch circuits 40 and 41 output signals Sd' and Se' shown in FIG. 10B, respectively.

Figure 2:
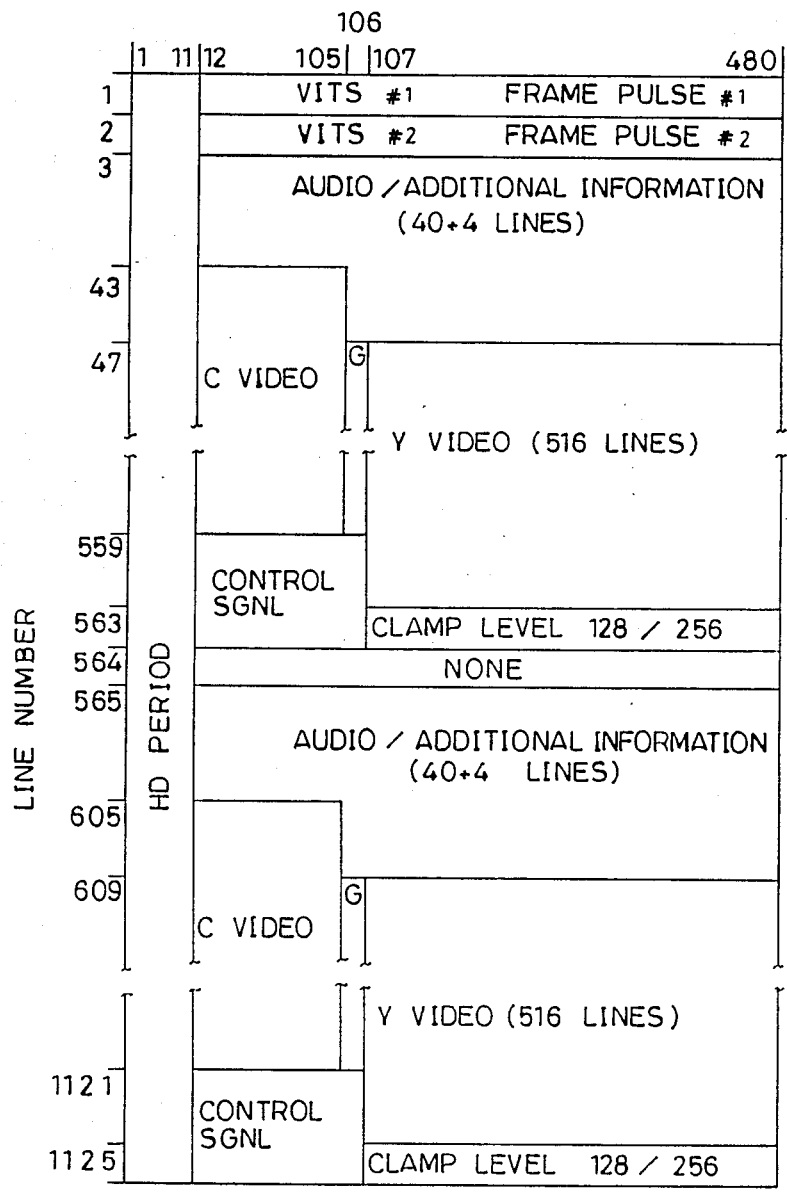
FIG. 2 is a format diagram showing a transmission signal format based on the MUSE system.
Figure 3:
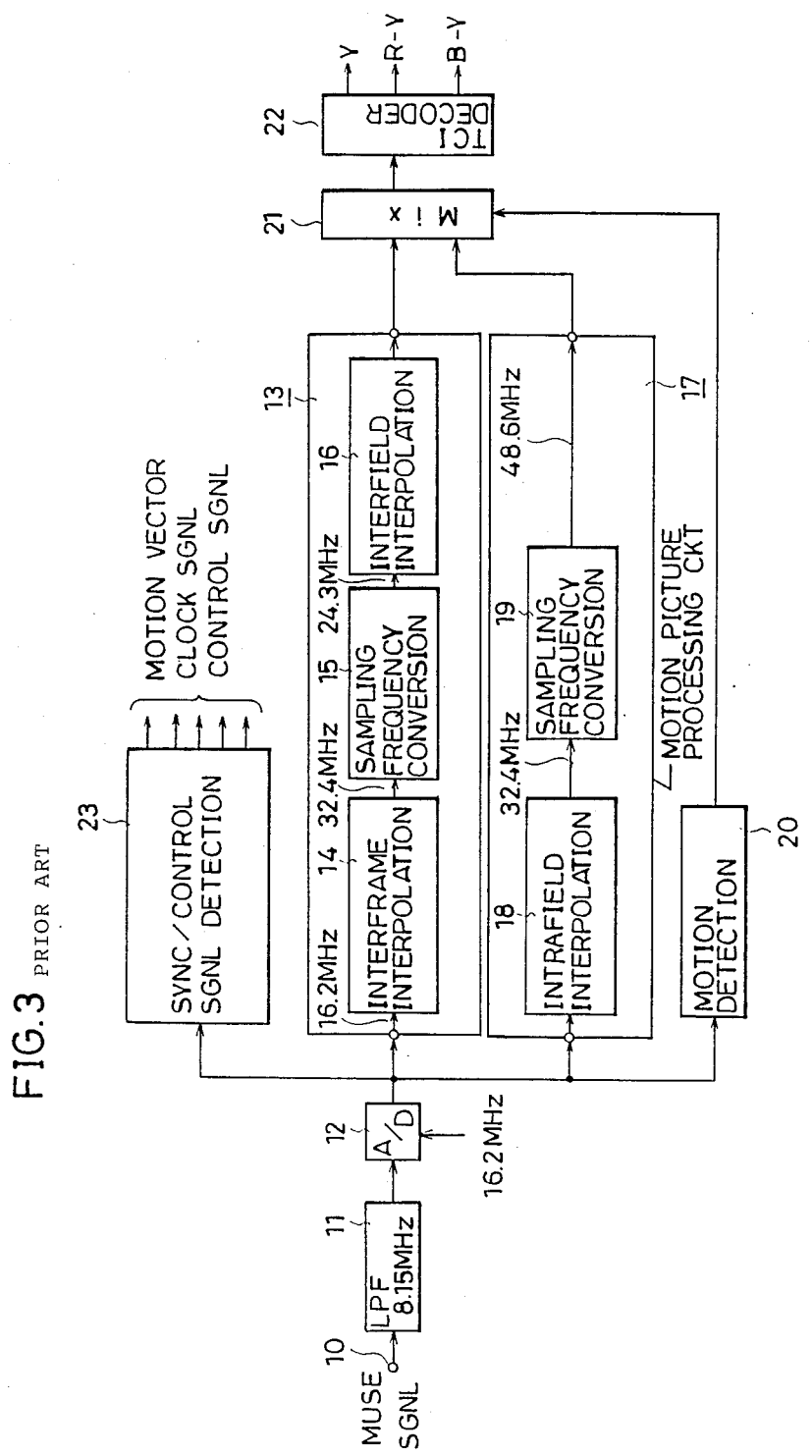
FIG. 3 is a schematic block diagram of a conventional MUSE decoder.
Figure 4:
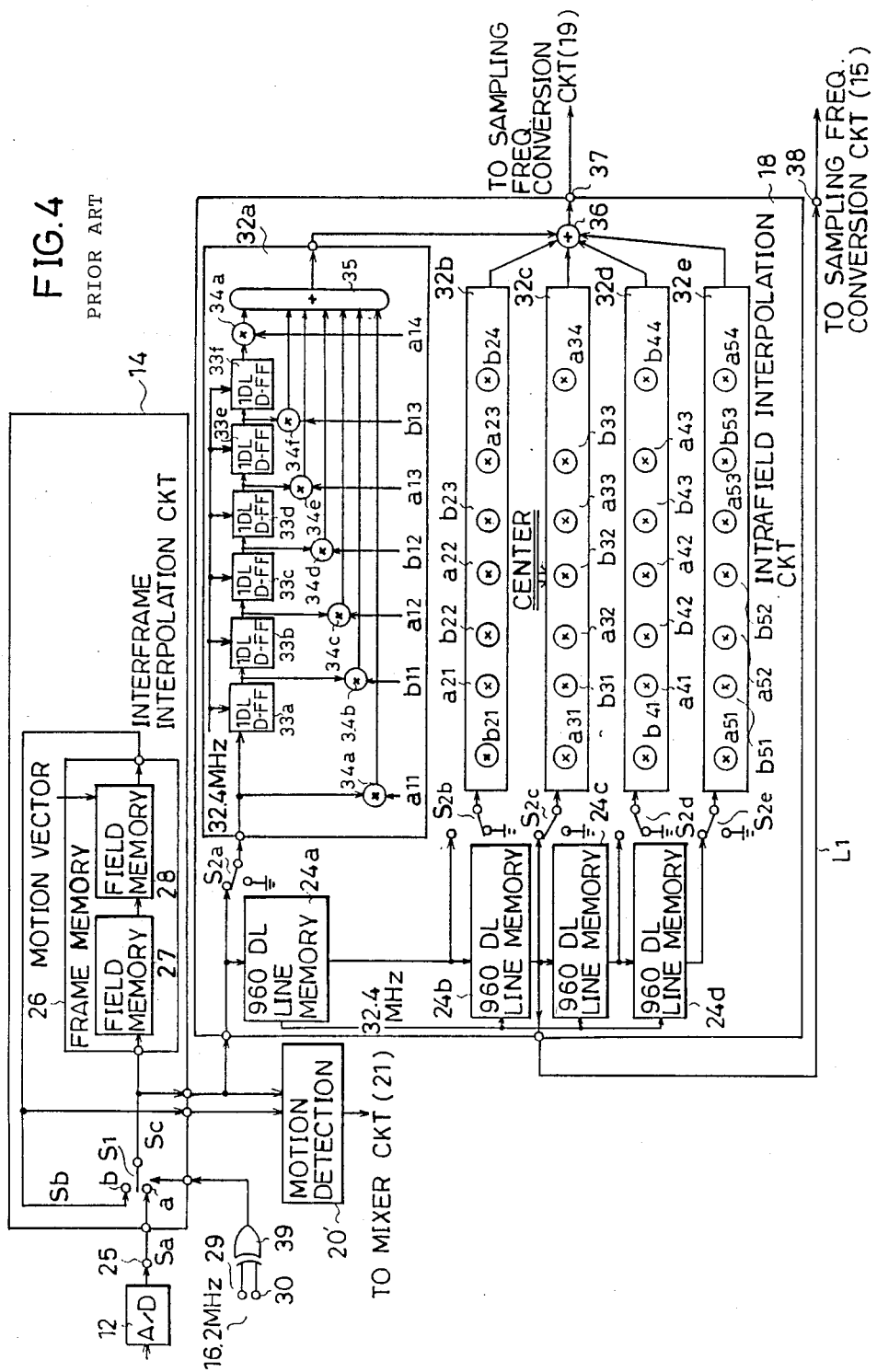
FIG. 4 is a block diagram of a conventional intrafield interpolation circuit.

Line memories 42a-42d each constituting one horizontal scanning period delay circuit operate in response to a clock signal of 16.2 MHz have capacities half those of the one-line memories 24a-24d shown in FIG. 4. One-dimensional transversal filters 43a-43e are different in tap coefficient and circuit configuration from transversal filters 32a-32e shown in FIG. 4. Delay elements 33h, 33i and 33j in one pixel unit, comprising the D type-FF, operate responsive to the clock signal of 16.2 MHz. The transversal filter 43a comprises a first operation circuit 44 for carrying out a filter operation in response to four successive pixel signals, a second operation circuit 45 for carrying out the filter operation in response to three successive pixel signals, tap coefficient multipliers 34a-34g comprising ROMs, adders 46 and 47, delay elements 48 and 49 in the unit of one pixel, each comprising the D type-FF and operating in response to the clock signal of 16.2 MHz, and switches S4a, S4b and S4c switching for each one horizontal scanning period.

Switches S5a–S5e which switch for each 30 nsec (32.4 MHz) are provided in the respective transversal filters 43a–43e. The switches S4a–S4c in the one-dimensional transversal filters 43a–43e are controlled in response to output signals from inverters I1 and I2. That is, in the view point of a control of the connection of the switches provided in the one-dimensional transversal filters 43a–43e, these one dimensional transversal filters are divided into one group 43a, 43c and 43e and the other group 43b and 43d.

A latch circuit 51 comprising the D type-FF latches the pixel signals in the previous frame (the solid circles ● in FIG. 7) and removes the pixel signals in the present frame (the hollow circles ○ in FIG. 7). An input signal Sc and an output signal Sf of this latch circuit 51 are shown in FIG. 10B. A latch circuit 52 comprising the D type-FF outputs a signal Sg whose timing is controlled as shown in FIG. 10B. This output signal Sg is applied to the one-line memories 42e and 42f each forming one horizontal scanning period delay circuit. These one-line memories 42e and 42f operate responsive to the clock signal of 16.2 MHz and have the same memory capacities as the line memories 42a–42d. A switch S6 for interframe interpolation signal reproduction is connected to respective outputs of the line memories 42b and 42f.

Next, the operation will now be described. An interframe interpolation signal Sc outputted from the switch S1 is applied to the latch circuit 40, so that only the pixel signal denoted with ○ in the present frame is latched in this latch circuit 40. The EX-OR gate 39 receives a control signal, which is applied through a terminal 30 and inverted between the lines and between the frames, and the clock signal of 16.2 MHz. Therefore, the EX-OR gate 39 supplies a signal of 16.2 MHz to the latch circuit 40. The pixel signal in the present frame, extracted from the latch circuit 40 is then applied to the next latch circuit 41, so that the timing of the applied signals are controlled.

This will be described in more detail with reference to FIG. 10B. The pixel signal Sc shown in FIG. 10B is applied to the latch circuit 40. The latch circuit 40 latches only the pixel signal in the present frame and outputs the signal Sd shown in FIG. 10B. That is, the latch circuit 40 removes pixels S11, S13, S15, ... S17... , S20, S22... in the previous frame from the pixel signal Sc. However, since an interline offset corresponding to one clock period of 32.4 MHz is remained for each one horizontal scanning period, the latch circuit 41 again latches the signal Sd by employing the clock signal φ of 16.2 MHz shown in FIG. 10B. This latch results in a video signal Se in which the timings are adjusted equally between any lines as shown in FIG. 10B.

Conversely, the latch circuit 40, after one frame period, latches new frame pixel signals S11, S13, S15, S17. .. S20, S22... and removes the pixel signals S10, S12, S14, S16... S21, S23....

As mentioned above, the latch circuits 40 and 41 latch only the pixel signals in the present frame, so that a signal whose timing is controlled is applied as a video signal at a 16.2 MHz rate to the line memory 42a and the one-dimensional transversal filter 43a. The video signal delayed by one line, which is to be outputted through the line memory 42a, is then applied to the line memory 42b and the one-dimensional transversal filter 43b. Similarly, an output of the line memory 42b is supplied to the line memory 42c and the one-dimensional transversal filter 43c. An output of the line memory 42c is supplied to the line memory 42d and the one-dimensional transversal filter 43d. An output of the line memory 42d is supplied to the one-dimensional transversal filter 43e.

The operations of the one-dimensional transversal filters 43a–43e will now be described. The signal Se shown in FIG. 10B is outputted from the latch circuit 41. It is assumed, for example, that pixel signals S56, S54, S52 and S50 are present on nodes A, B, C and D, respectively, shown in FIG. 10A. At this time, pixel signals S47, S45, S43 and S41 are present on the corresponding nodes E, F, G and H; pixel signals S36, S34, S32 and S30 are present on the respective nodes I, J, K, and L; pixel signals S27, S25, S23 and S21 on the respective nodes M, N, 0, and P; and pixel signals S16, S14, S12 and S10 on the respective nodes Q, R, S and T.

Multipliers 34a–34g provided in the one-dimensional transversal filter 43a are provided with tap coefficients a14, a13, a12, a11, b13, b12 and b11, respectively. Therefore, the adder 46 outputs the term (1) shown in the expression (A) described above as a result of the operation, based on the successive four pixel signals. Since all the switches S4a, S4b and S4c are connected to their respective terminals b at this time, the three successive pixel signals S52, S54 and S56 are applied to the multipliers 34e, 34f and 34g, respectively. Therefore, the adder 47 outputs a result of the operation shown by the term (6) in the above expression (B). These results of the operation of the adders 46 and 47 are provided to the switch S5a respectively through the D type-FFs 48 and 49.

Similarly, multipliers provided in the second one-dimensional transversal filter 43b in correspondence with the multipliers 34a–34g in the first one-dimensional transversal filter 43a are provided with coefficients b24, b23, b22, b21, a23, a22 and a21 as tap coefficients, respectively. The corresponding multipliers in the third transversal filter 43c are provided with tap coefficients a34, a33, a32, a31, b33, b32 and b31, respectively. The corresponding multipliers in the fourth transversal filter 43d are provided with tap coefficients b44, b43, b42, b41, a43, a42, a41, respectively. The corresponding multipliers in the fifth transversal filter 43e are provided with tap coefficients a54, a53, a52, a51, b53, b52 and b51, respectively. The results of the operation expressed by the respective terms (7), (3), (9) and (5) are obtained from circuits corresponding to the first operation circuits 44 provided respectively in the transversal filters 43b, 43c, 43d and 43e.

Four groups of the three switches provided respectively in the second, third, fourth and fifth transversal filters 43b, 43c, 43d and 43e, which correspond to the three switches S4a, S4b and S4c in the first transversal filter 43a, are connected to the terminals a, b, a and b, respectively. That is, the second operation circuits 45 provided in the respective second, third, fourth and fifth transversal filters 43b–43e output the respective terms (2), (8), (4) and (10) as the results of the operation.

As will be recognized in the above description, during the first half of the 16 MHz clock period, the switches S5a–S5e are connected respectively to the terminals a, b, a, b and a, and all the outputs thereof are added by the adder 36. Therefore, the pixel signal S33 for the intrafield interpolation expressed in the expression (A) is obtained.

Meanwhile, in the latter half of the 16 MHz clock period, the switches S5a–S5e are connected respectively to the opposite terminals b, a, b, a and b, and all the output thereof are added by the adder 36. Therefore, the pixel signal S34 for the intrafield interpolation expressed in the expression (B) is obtained.

With a repetition of the above described operations, the pixel signals S33, S34, S35, S36... for the intrafield interpolation in one horizontal scanning period are sequentially outputted from the adder 36. That is, during one horizontal scanning period, the switches S4a-S4c and their corresponding switches in the other transversal filters 43b-43e are kept connected as they are, while only the switches S5a-S5e are switched above described clock period, i.e., at a 32.4 MHz rate, whereby the adder 36 outputs signals S33, S34, S35, S36... for the intrafield interpolation having a frequency of 32.4 MHz.

A description will then given on the operation after one horizontal scanning period has passed since this time. At this time, pixel signals S67, S65, S63, S61 are present on the respective nodes A, B, C, and D; pixel signals S56, S54, S52, S50 are present on the respective nodes E, F, G and H; pixel signals S47, S45, S43, S41 are present on the respective nodes I, J, K and L; pixel signals S36, S34, S32, S30 are present on the respective nodes M, N, 0 and P; and pixel signals S27, S25, S23, S21 are present on the respective nodes Q, R, S and T.

Since signals for controlling the switches S4a-S4c are inverted at this time, the switches S4a-S4c in the first transversal filter 43a are connected to the respective terminals a. Further, the four groups of the three switches provided respectively in the second to fifth transversal filters 43b-43e are connected to the terminals b, a, b, a, respectively. That is, all the groups of the three switches provided respectively in the transversal filters 43a-43e are connected to the opposite terminals for each horizontal scanning line.

Since the phase of the 16.2 MHz clock signal for controlling the switches S5a-S5e is also inverted, the switches S5a-S5e are connected respectively to the terminals b, a, b, a, b during the first half of one clock period of 16.2 MHz. Therefore, the adder 36 outputs the pixel signal S43 subjected to the filtering for the intrafield interpolation shown in the following expression (C).

$$\begin{aligned}S43 = &\ b13 \cdot S61 + b12 \cdot S63 + b11 \cdot S65 + \\ &\ b24 \cdot S50 + b23 \cdot S52 + b22 \cdot S54 + b21 \cdot S56 + \\ &\ b33 \cdot S41 + b32 \cdot S43 + b31 \cdot S45 + \\ &\ b44 \cdot S30 + b43 \cdot S32 + b42 \cdot S34 + b41 \cdot S36 + \\ &\ b53 \cdot S21 + b52 \cdot S23 + b51 \cdot S25\end{aligned} \quad (C)$$

Meanwhile, the switches S5a-S5e are connected respectively to the terminals a, b, a, b, a during the latter half of the one clock period of 16.2 MHz. Therefore, the adder 36 outputs the pixel signal S44 subjected to the filtering for the intrafield interpolation, shown in the following expression (D).

$$\begin{aligned}S44 = &\ a14 \cdot S61 + a13 \cdot S63 + a12 \cdot S65 + a11 \cdot S67 + \\ &\ a23 \cdot S52 + a22 \cdot S54 + a21 \cdot S56 + \\ &\ a34 \cdot S41 + a33 \cdot S43 + a32 \cdot S45 + a31 \cdot S47 + \\ &\ a43 \cdot S32 + a42 \cdot S34 + a41 \cdot S36 + \\ &\ a54 \cdot S21 + a53 \cdot S23 + a52 \cdot S25 + a51 \cdot S27\end{aligned} \quad (D)$$

As described above, the switches S4a-S4c in the first transversal filter 43a and the corresponding switches in the other transversal filters 43b-43e are kept in the opposite connection state to adjacent lines during the period for intrafield interpolating pixels on the line on which the pixel signals S43 and S44 are present. Since the switches S5a-S5e are switched to the opposite terminals to the adjacent lines, i.e., the terminals b, a, b, a, b, respectively, in the first half of the clock period of 16.2 MHz and to the terminals a, b, a, b, a, respectively, in the latter half of the period, the adder 36 periodically outputs signals which are interfield-interpolated at 32.4 MHz.

Comparing an operation processing for the pixel signals S33, S34 on the n+2 line with the operation processings for the pixel signals S43, S44 on the n+3 line, the three switches S4a-S4c and the corresponding switches in the other transversal filters 43b-43e together with the switches S5a-S5e have their connected terminals inverted for each horizontal scanning line. Similarly, when pixels on the n+4 line are interpolated, a switching control opposite to the one in the n+3 line, that is, the same switching control as in the case that pixels on the n+2 line are interpolated is carried out. The switches S4a-S4c are controlled with phases which are mutually inverted for each line, as mentioned above.

A description will be given on the operation after one frame, i.e., the operation in case that the signal Sg shown in FIG. 10B is outputted from the latch circuit 41. It is now assumed that the pixel signals S57, S55, S53, S51 are present at the respective nodes A, B, C, D; the pixel signals S46, S44, S42, S40 are present on the respective nodes E, F, G, H; the pixel signals S37, S35, S33, S31 are present on the respective nodes I, J, K, L; the pixel signals S26, S24, S22, S20 are present on the respective nodes M, N, 0, P; and the pixel signals S17, S15, S13, S11 are present on the respective nodes Q, R, S, T.

The switches S4a-S4c in the first transversal filter 43a are all connected to their terminals a, while the corresponding switches in the second to fifth transversal filters 43b-43e are connected to the terminals b, a, b, a, respectively. In addition, since the switches S5a-S5e are connected respectively to the terminals b, a, b, a, b in the first half of the 16.2 MHz clock period, the adder 36 outputs the pixel signal S33 subjected to the intrafield interpolation as shown below.

$$\begin{aligned}S33 = &\ b13 \cdot S51 + b12 \cdot S53 + b11 \cdot S55 + \\ &\ b24 \cdot S40 + b23 \cdot S42 + b22 \cdot S44 + b21 \cdot S46 + \\ &\ b33 \cdot S31 + b32 \cdot S33 + b31 \cdot S35 + \\ &\ b44 \cdot S20 + b43 \cdot S22 + b42 \cdot S24 + b41 \cdot S26 + \\ &\ b53 \cdot S11 + b52 \cdot S13 + b51 \cdot S15\end{aligned} \quad (E)$$

Meanwhile, the switches S5a-S5e are connected to the terminals a, b, a, b, a, respectively, in the latter half of the 16.2 MHz clock period. Thus, the adder 36 outputs the pixel signal S34 which is interfield-interpolated as shown below.

$$\begin{aligned}S34 = &\ a14 \cdot S51 + a13 \cdot S53 + a12 \cdot S55 + a11 \cdot S57 + \\ &\ a23 \cdot S42 + a22 \cdot S44 + a21 \cdot S46 + \\ &\ a34 \cdot S31 + a33 \cdot S33 + a32 \cdot S35 + a31 \cdot S37 + \\ &\ a43 \cdot S22 + a42 \cdot S24 + a41 \cdot S26 + \\ &\ a54 \cdot S11 + a53 \cdot S13 + a52 \cdot S15 + a51 \cdot S17\end{aligned} \quad (F)$$

The position of the switches when these pixel signals S33 and S34 are generated is opposite to that of the switches when the pixel signals S33 and S34 one frame before are generated. That is, the switches S4a–S4c and the corresponding switches in the transversal filters 43b–43e together with the switches S5a–S5e are controlled so as to be mutually inverted between the lines and between the frames, so that the adder 36 outputs pixel signals for the intrafield interpolation which is always normal.

The switches S4a–S4c and the corresponding switches in the transversal filters 43b–43e have their connected points changed for each one horizontal scanning period, and the switches S5a–S5e are switched at each 32.4 MHz, whereby a relationship between the horizontal scanning lines and between the frames is inverted. A control signal for inverting the switches for each horizontal scanning line and each frame can be easily obtained in response to a sampling signal inputted through the terminal 30. The switches S4a–S4c and the corresponding switches in the transversal filters 43c and 43e are controlled in response to this sampling signal applied to the terminal 30. In addition, the corresponding switches in the transversal filters 43b and 43d are controlled in response to a signal inverted by the inverter I1. The switches S5a, S5c and S5e are controlled in response to an output signal of the EX-OR gate 39. The switches S5b and S5d are controlled in response to an output signal of the EX-OR gate 39, inverted by the inverter I2. That is, the switches in the first, third and fifth transversal filters 43a, 43c and 43e are controlled in response to the common signal, while those in the second and fourth transversal filters 43b and 43d are also controlled in response to the other common signal.

The latch circuit 51 receives a clock signal inverted from the clock signal to be inputted to the latch circuit 40. Thus, when the latch circuit 40 is outputting the signal Sd shown in FIG. 10B, the latch circuit 51 latches only the pixel signals one frame before and outputs the signal Sf shown in FIG. 11. The output signal Sf of this latch circuit 51 has its timing controlled by the latch circuit 52, so that the signal Sg shown in FIG. 10B is outputted from the latch circuit 52.

The signal one frame before at the 16.2 MHz rate thus obtained is applied to the line memories 42e and 42f and then delayed by two horizontal scanning periods. Consequently, the signal timing of the line L2 coincides with that of the line memory 42f.

Those two output signals are applied to a switch S6. This switch S6 is controlled in response to an output signal of the EX-OR gate 39, thereby outputting the original signal Sc shown in FIG. 10B. That is, since the switch S6 is switched to the terminal b at the present frame pixel timing and to the terminal a at the previous frame pixel timing at 32.4 MHz and this connection is inverted between the lines and between the frames, the present and previous frame signals are interpolated as the original frame signal is.

An output signal of the switch S6, which is outputted through the terminal 38, is delayed by 2H compared to a MUSE signal to be applied to the input terminal 25. Since an output signal of the adder 36 is delayed by approximately 2H, signals at almost the same timing can be obtained through the terminals 37 and 38, respectively. The former signal out of those two signals is employed as a still picture signal, while the latter signal is employed as a motion picture signal. As mentioned above, the addition of those few circuits causes the line memories 42e and 42f to be employed for the delay of only the pixels in the previous frame, thereby easily obtaining an output signal for a still picture at about the same timing as an output signal for a motion picture.

Figure 10D:
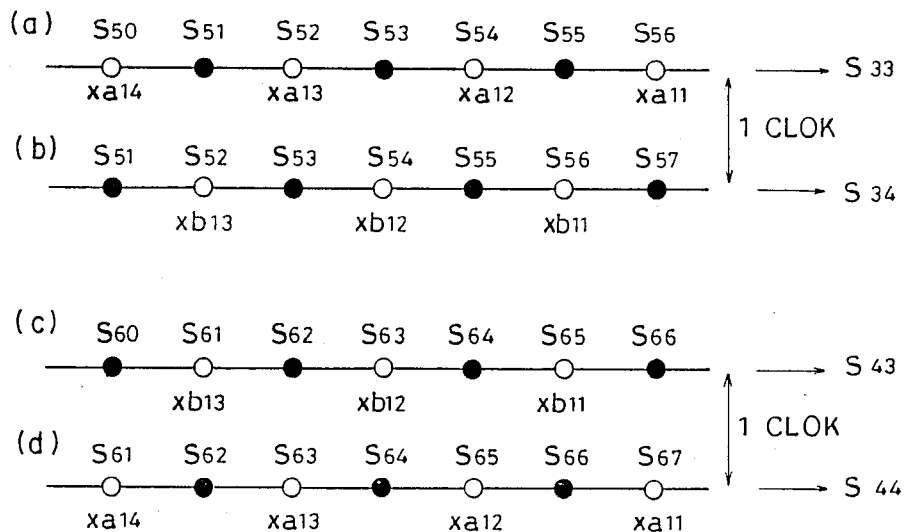
FIG. 10D is a conception diagram showing a relationship between the pixel signals subject to an operation and tap coefficients, in the intrafield interpolation circuit in FIG. 10A.
Figure 6:
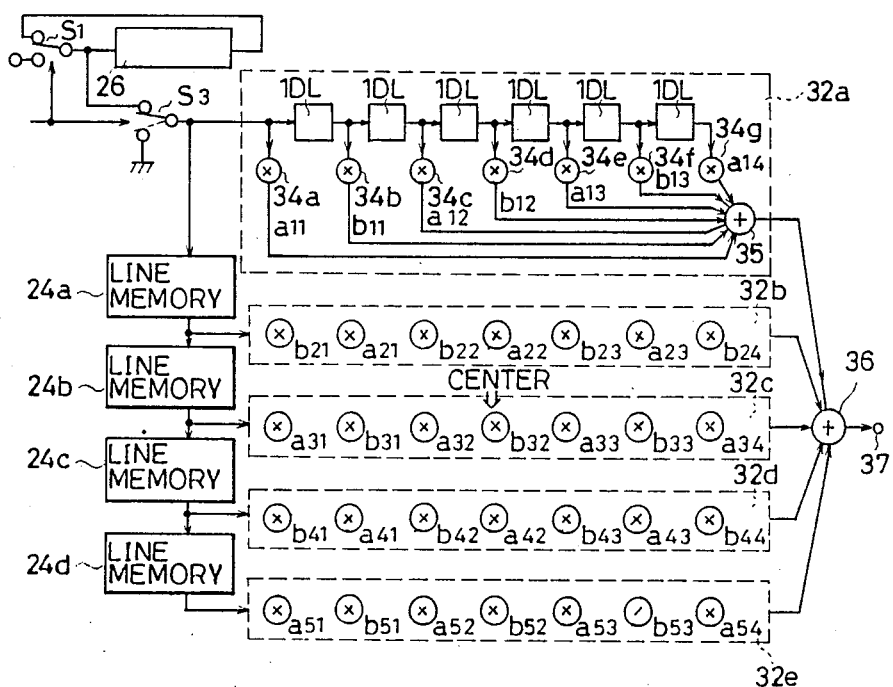
FIG. 6 is an equivalent circuit diagram of the intrafield interpolation circuit shown in FIG. 4.
Figure 10A:
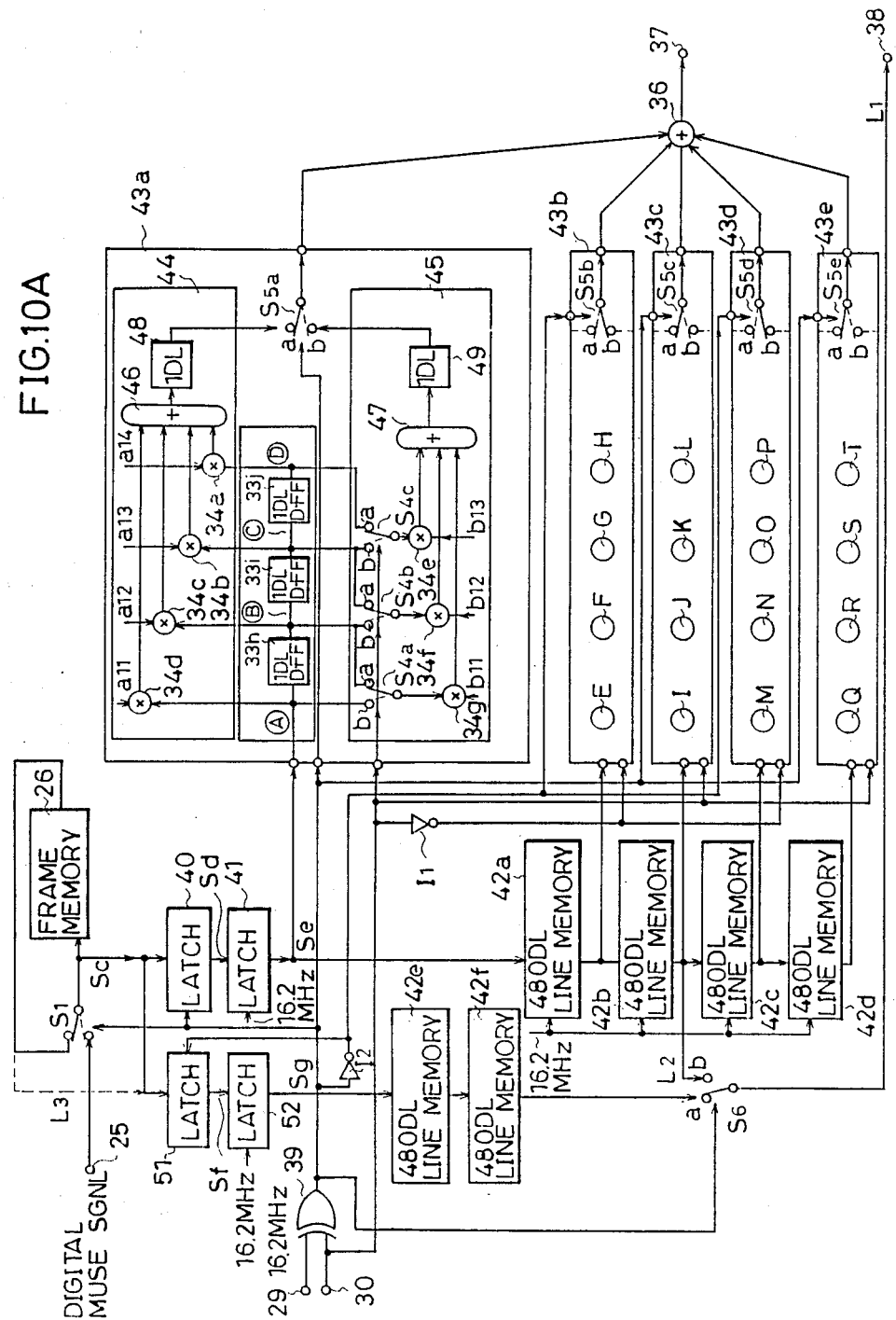
FIG. 10A is a circuit block diagram of an intrafield interpolation circuit showing one embodiment of the present invention.
Figure 10B:
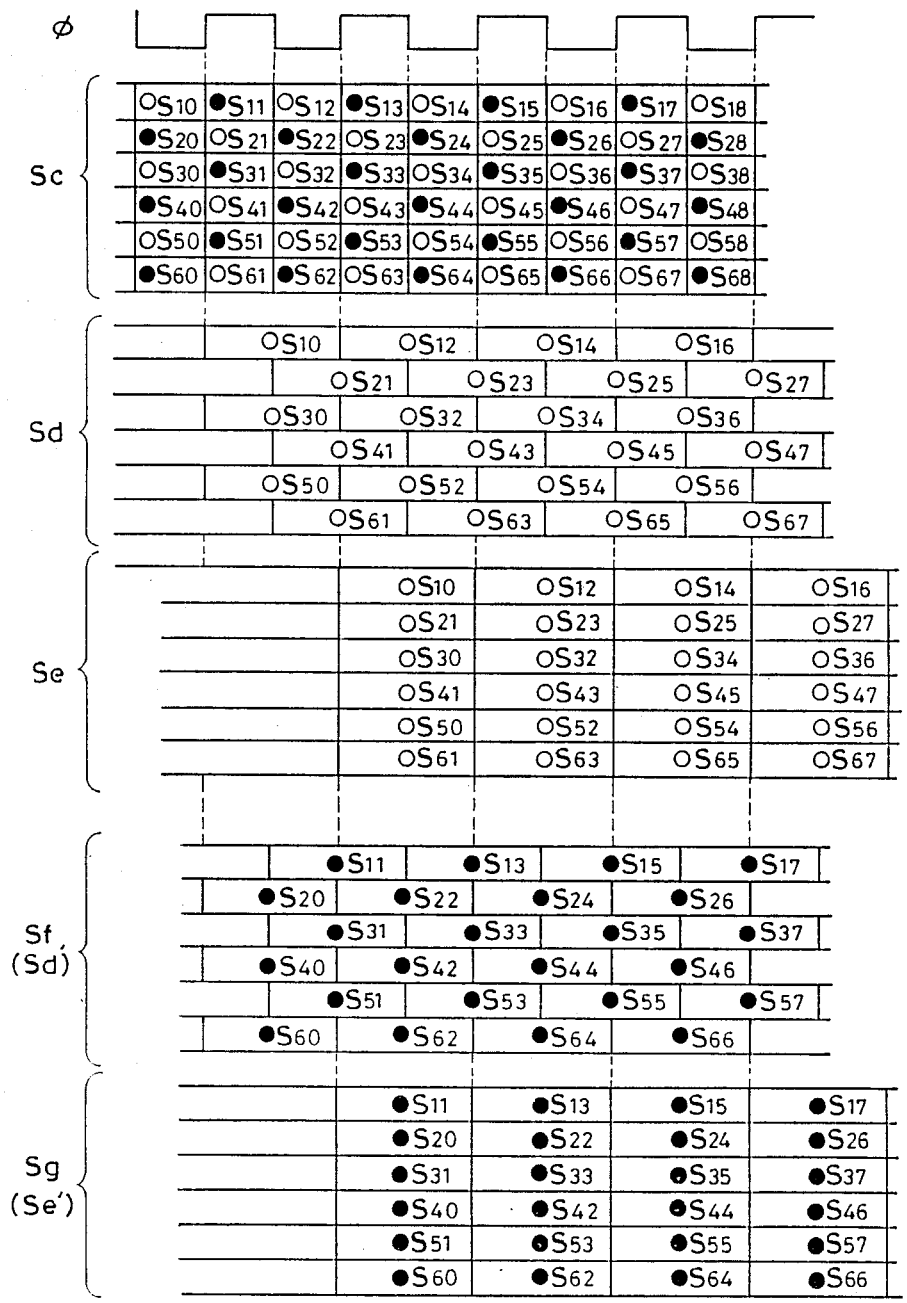
FIG. 10B is a timing chart for describing an operation of the intrafield interpolation circuit shown in FIG. 10A.

The pixel signals processed by the circuit shown in FIG. 10A can be understood in more detail with reference to FIGS. 10C and 10D. That is, the processing represented in the above expression (A) is carried out in response to the pixel signals denoted with the hollow circles O in the area, enclosed by the broken line in FIG. 10C (a). Similarly, the processings represented in the expressions (B), (C) and (D) are carried out in response to the pixel signals (denoted with the hollow circle O), (in the areas) enclosed by the broken lines in FIG. 10C (b), (c) and (d), respectively.

FIG. 10D (a) to (d) show correspondences of the pixel signals on the last lines and coefficients to be multiplied in the areas enclosed by the broken lines of FIG. 10C. FIG. 10D (a) to (d) are corresponding to FIG. 10C (a) to (d), respectively. It can be understood as shown in FIGS. 10C and 10D that the correspondences of the pixel signals and the coefficients are alternately shifted between the adjacent lines and between the adjacent frames. Therefore, the switching controls of the switches S4a–S4c and S5a–S5e shown in FIG. 10A are required, as mentioned above.

While the latch circuit 51 is connected to receive an output signal of the switch S1 in the first embodiment shown in FIG. 10A, the latch circuit 51 can be connected so as to latch only the signals one frame before out of a signal in which the signals one frame before and those two frames before are interpolated, as shown by the broken line L3.

Figure 11:
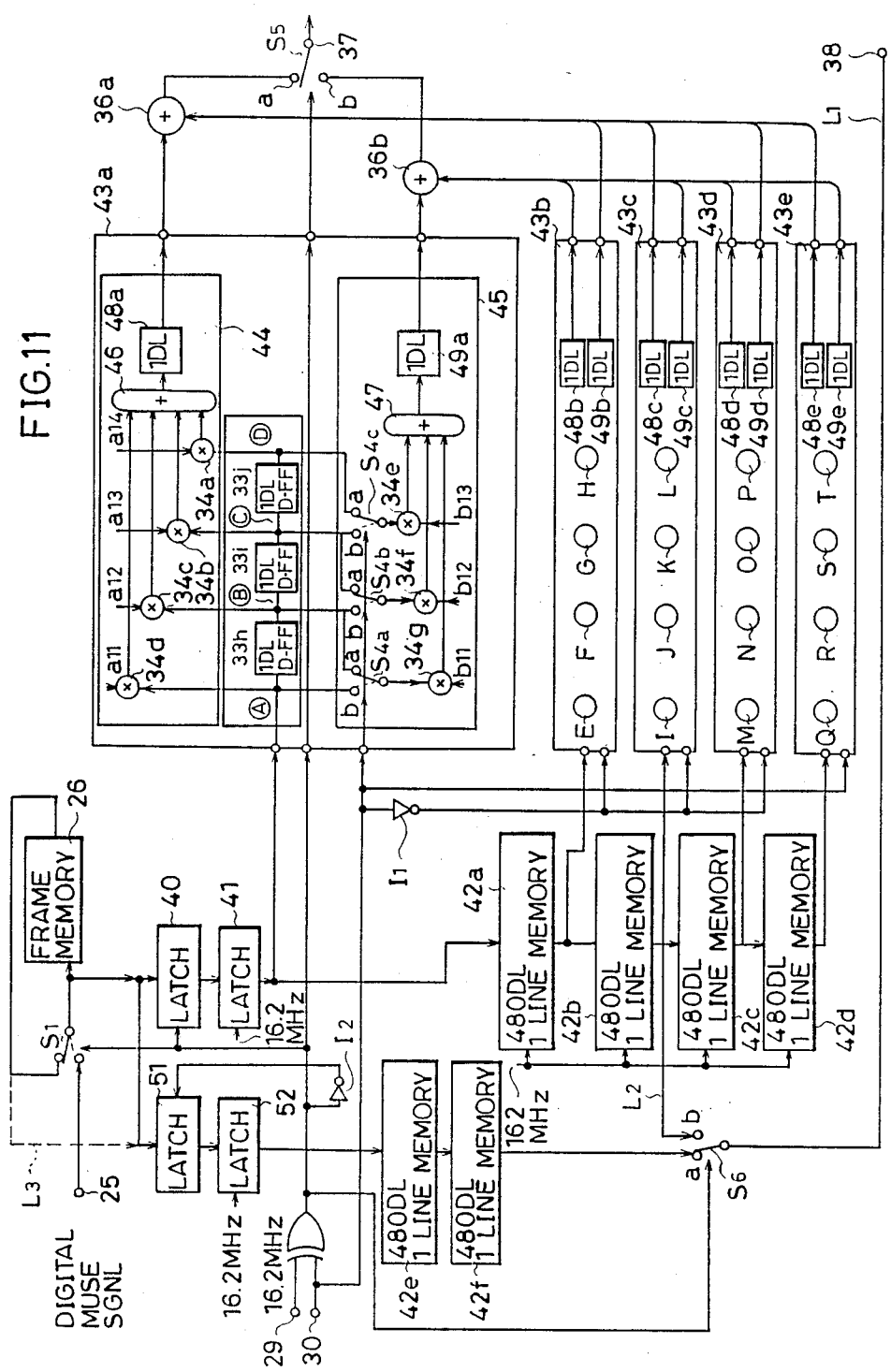
FIGS. 11-17 are circuit block diagrams showing second to eighth embodiments of the present invention, respectively.

The second embodiment of the present invention is shown in FIG. 11. In a circuit shown in FIG. 11, compared to the one in FIG. 10A, one switch S5 is provided outside the transversal filters in place of the switches S5a–S5e provided in the respective transversal filters 43a–43e. The switch S5 has an input terminal a connected to an output of an adder 36a and the other input terminal b connected to an output of an adder 36b. The adders 36a and 36b are connected to selectively receive output signals from D type flip-flop 48a–48e and 49a–49e provided in the transversal filters 43a–43З. While the adder 36 in FIG. 10A operates responsive to the clock signal of 32.4 MHz, those adders 36a and 36b in FIG. 11 operate responsive to the clock signal of 16.2 MHz. That is, an adding processing is carried out at half the operation speed.

Figure 12:
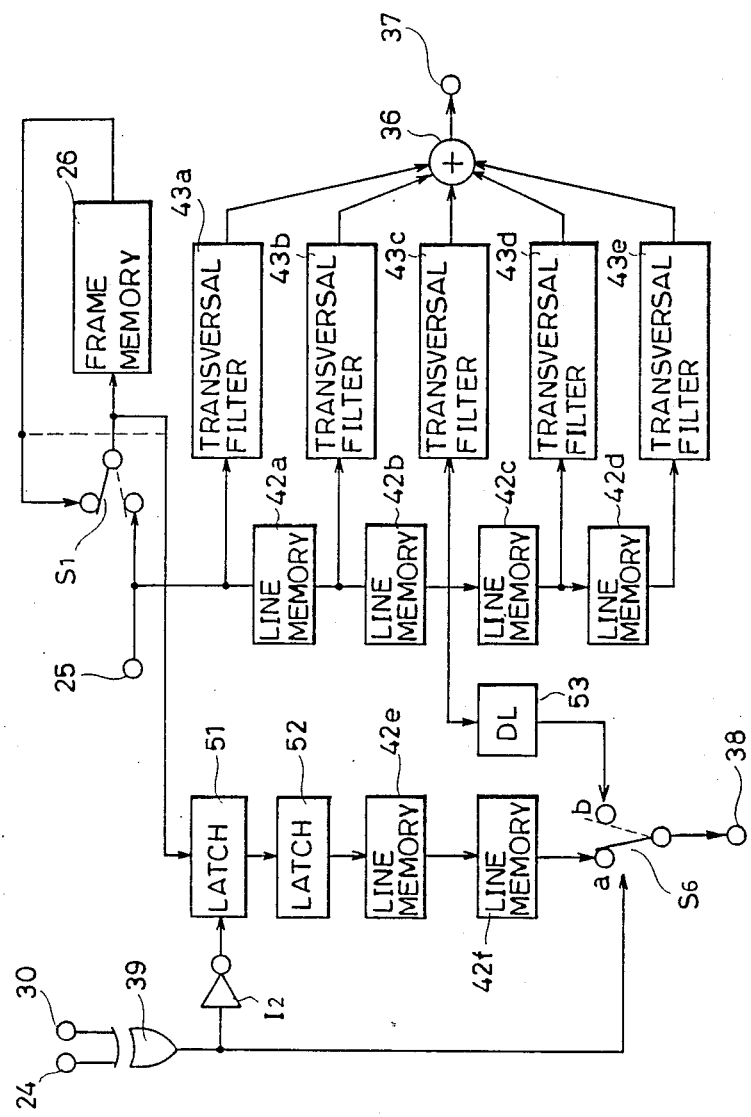

Reference is now made to FIG. 12 showing the third embodiment of the present invention. This embodiment directly employs the present frame signal to be inputted through an input terminal 25 as an input signal to the intrafield interpolation circuit. The corresponding portions to those shown in FIG. 10A are denoted with the same designations.

A signal one frame before is latched by latch circuits 51 and 52 in response to a signal in the present frame and an output signal of the switch S1, which is interframe-interpolated, or a signal two frames before and an output signal (shown by the broken line) of a frame memory 26, which is interframe-interpolated. This latch signal is delayed by 2H by the line memories 42e and 42f and applied to the terminal a of the switch S6. Meanwhile, the present frame signal causes a delay circuit 53 for controlling a delay to control the timing of an output signal from the line memory 42b and that of a frame signal to be applied to the terminal a of the switch S6.

The present frame signal with its timing controlled is applied to the terminal b of the switch S6. The switch S6 is controlled in response to an output signal from the EX-OR gate 39 to output a signal for a still picture through the terminal 38.

Figure 13:
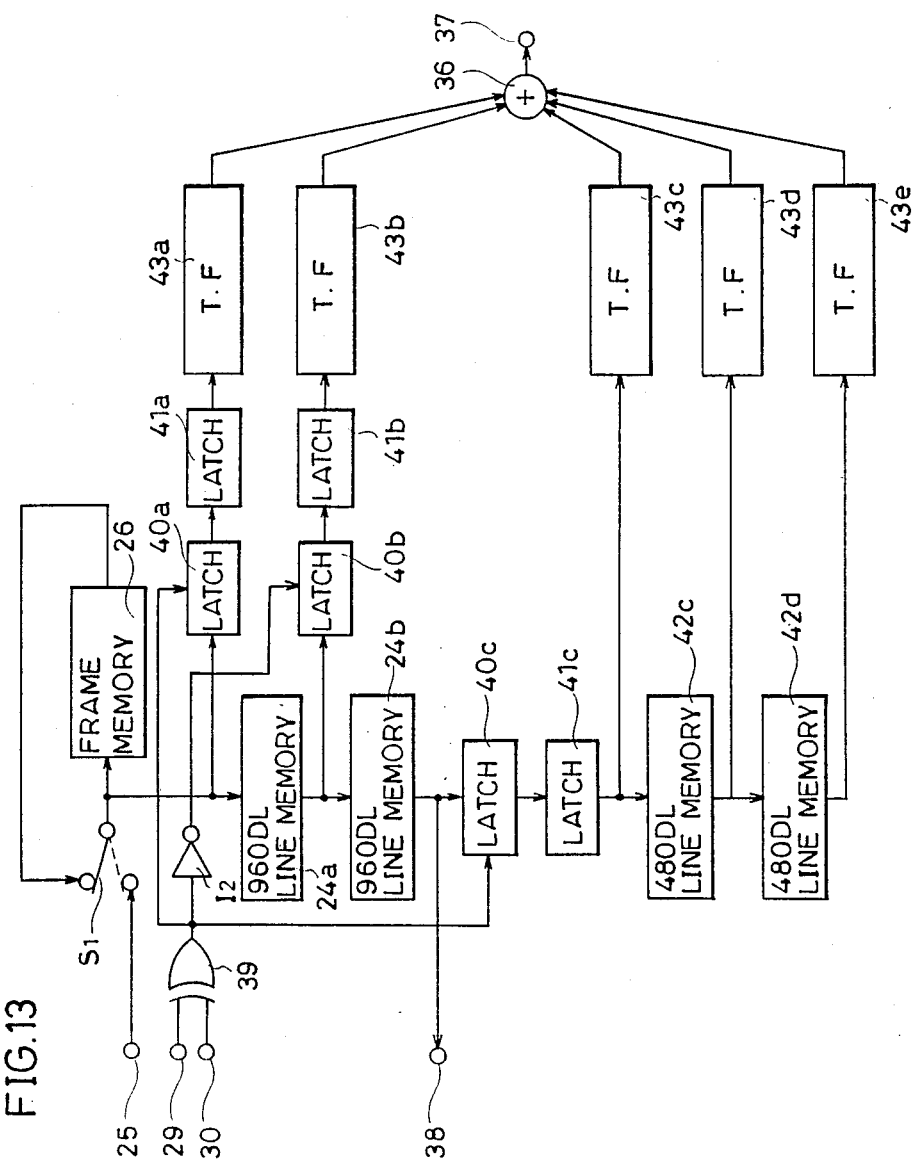

Reference is now made to FIG. 13 showing the fourth embodiment of the present invention. 2H delay of the signal for the still picture processing is carried out by the intrafield interpolation circuit in this embodiment.

Latch circuits 40a and 40c latch only the present frame signal in response to a signal outputted from the EX-OR gate 39. A latch circuit 40b latches only the present frame signal in response to a signal outputted from the inverter I2. The latch circuits 41a–41c operate in response to the clock signal of 16.2 MHz. Line memories 24a and 24b operate in response to the clock signal of 32.4 MHz and serves as a 1H delay circuit. A video signal of 32.4 MHz, in which the present frame signal and the one-frame-before signal are interframe-interpolated by the switch S1, is 2H delayed by the line memories 24a and 24b. The latch circuit 40c latches only the present frame signal out of an output of the line memory 24b. The video signal is further 2H delayed by the line memories 42c and 42d operating at 16.2 MHz. The intrafield interpolation processing is carried out by operation processing of the present frame signal obtained by the latch circuits 40a and 41a out of an output of the switch S1, the present frame signal obtained by the latch circuits 40b and 41b out of an output of the line memory 24a, and the present frame signal outputted from the latch circuits 40c and 41c and the line memories 42c and 42d, by employing the one-dimensional transversal filters 43a–43e and the adder 36.

A signal for a still picture whose timing is approximately equal to that of an output signal subjected to the intrafield interpolation is directly outputted from the line memories 24a and 24b.

It is a feature of the fourth embodiment that the line memories 24a and 24b both have twice the capacities of the line memories 42c and 42d, and the operation speed is increased from 16.2 MHz to 32.4 MHz. The whole capacity of those line memories is equal to the one in the first and second embodiments. However, since the number of the line memories is reduced by two, the number of the circuits for controlling the line memories can also be reduced. It is also noticed that an output of the line memory 24b can directly be obtained as an output signal for a still picture.

Figure 14:
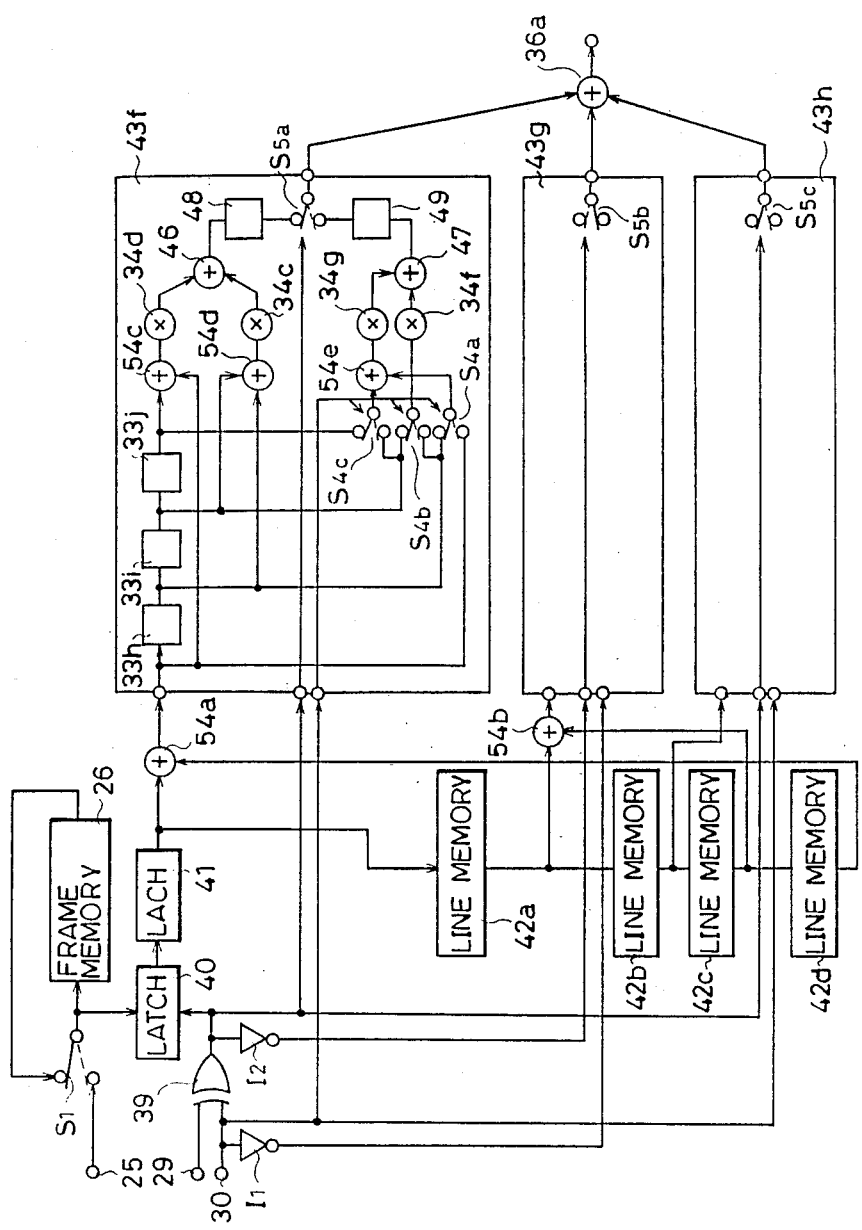

FIG. 14 shows the fifth embodiment of the present invention. This embodiment shows a case that tap coefficients of the intrafield interpolation circuit are set to be vertically and horizontally symmetrical with respect to the tap coefficient b32. Referring to FIG. 14, this circuit comprises adders 54a–54e, a multiplier 34d with the tap coefficient a11, a multiplier 34c with the tap coefficient a12, a multiplier 34g with the tap coefficient b11, and a multiplier 34f with the tap coefficient b12.

Since the tap coefficients are vertically and horizontally symmetrical, a relationship represented in the following expression (E) is established.

$$\begin{aligned}
&a11 = a14 = a51 = a54, b11 = b13 = b53 = b51 \\
&a12 = a13 = a52 = a53, b12 = b52 \\
&b21 = b24 = b41 = b44, a21 = a23 = a41 = a43 \\
&b22 = b23 = b42 = b43, a22 = a42, a31 = a34 \\
&b31 = b33, a32 = a33
\end{aligned} \quad (E)$$

In the fifth embodiment, the adders 54a and 54b add pixel signals to be multiplied by the tap coefficients which are vertically symmetrical, and then supply a result of the addition to one-dimensional transversal filters 43f–43h. Meanwhile, pixel signals to be multiplied by the tap coefficients which are horizontally symmetrical are added by respective adders 54c–54e and the corresponding adders provided in the filters 43g and 43h, and then supplied to the respective multipliers. At this time, the tap coefficients b21, b22, a21 and a22 are provided respectively to the multipliers provided in the filter 43g, corresponding to the multipliers 34d, 34c, 34g and 34f in the filter 43f. The multipliers in the filter 43h are provided with the tap coefficients a31, a32, b31 and b32, respectively. Since a control of the switches is identical to the one in the first embodiment shown in FIG. 10A, the description thereof will not be repeated. The tap coefficients of the multipliers are thus symmetrical, resulting in a simplified circuit configuration.

Figure 15:
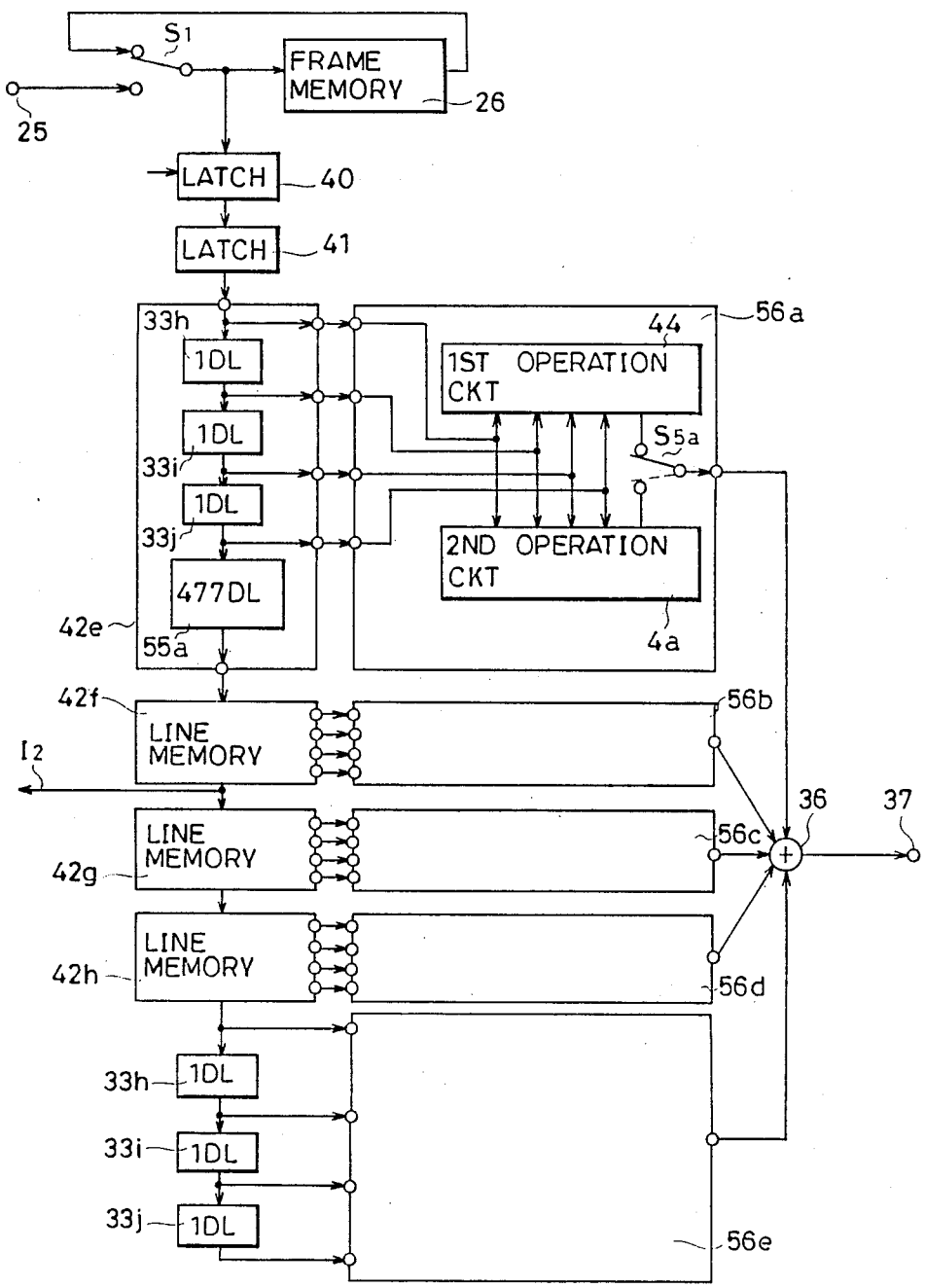

FIG. 15 shows the sixth embodiment of the present invention. It is noticed, in this embodiment, the delay circuits for one-dimensional transversal filters are provided in circuits for one horizontal scanning delay. 4 horizontal delay circuits 42e, 42f, 42g and 42h are provided. Each of the circuits 42e–42h comprises, as shown in the circuit 42e, for example, a delay circuit 55a having a delay time corresponding to one clock period of 477, and delay circuits 33h, 33i and 33j each having a delay time of one clock period. The delay circuit 55a comprises a shift register, a line memory and the like. Circuits 56b–56e have the same circuit configuration as that of a circuit 56a.

Figure 16:
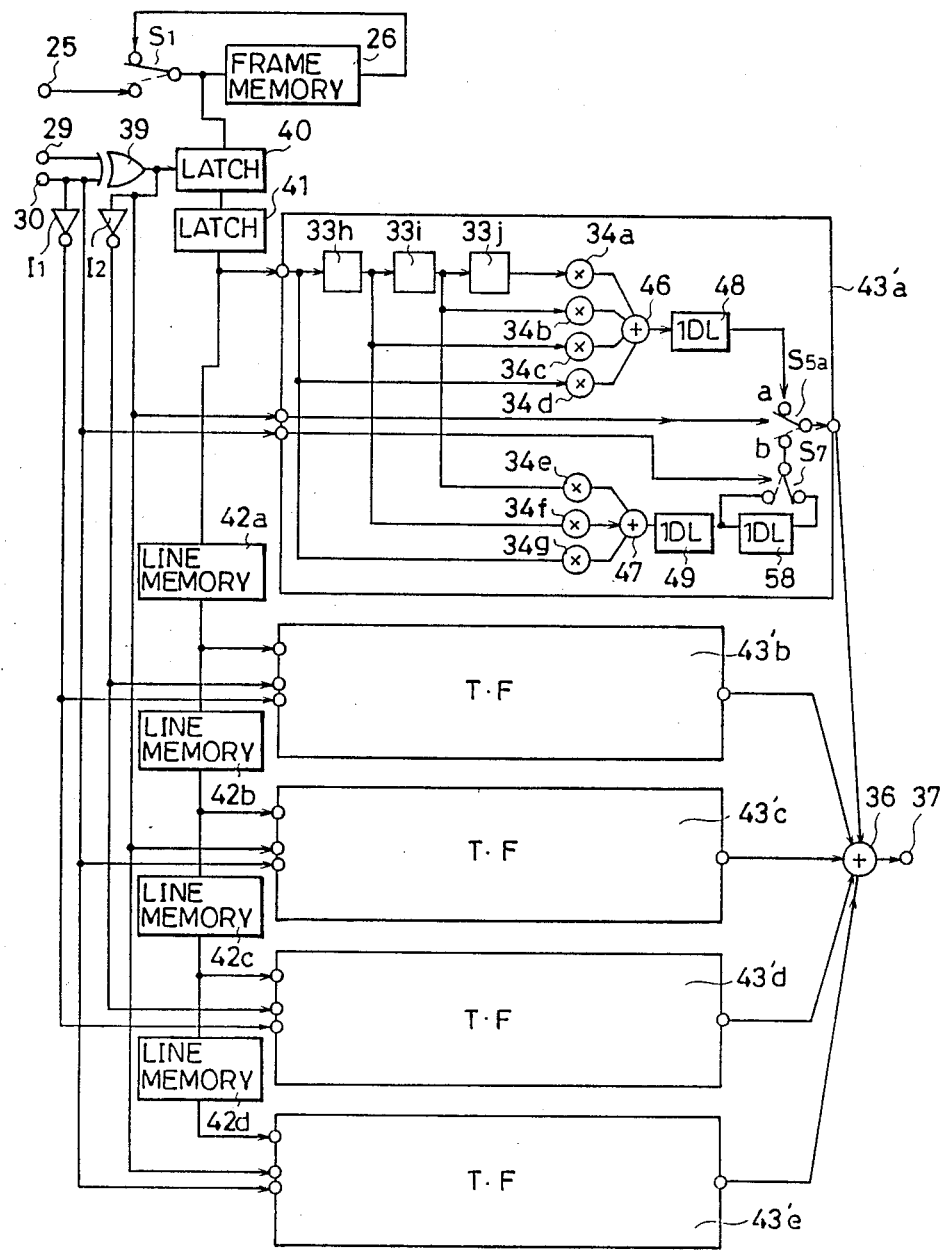

FIG. 16 shows the seventh embodiment of the present invention. In this embodiment, a selective control of delay by a switch S7 is employed in place of the switching to the multipliers 34e–34g by the switches S4a–S4c shown in FIG. 10A. That is, the switch S7 controls connections of delay elements 49 and 58 with one clock period, each comprising the D type-FF.

One-dimensional transversal filters 43'a, 43'b, 43'c, 43'd and 43'e all have the same circuit configurations except for having different tap coefficients.

Figure 17:
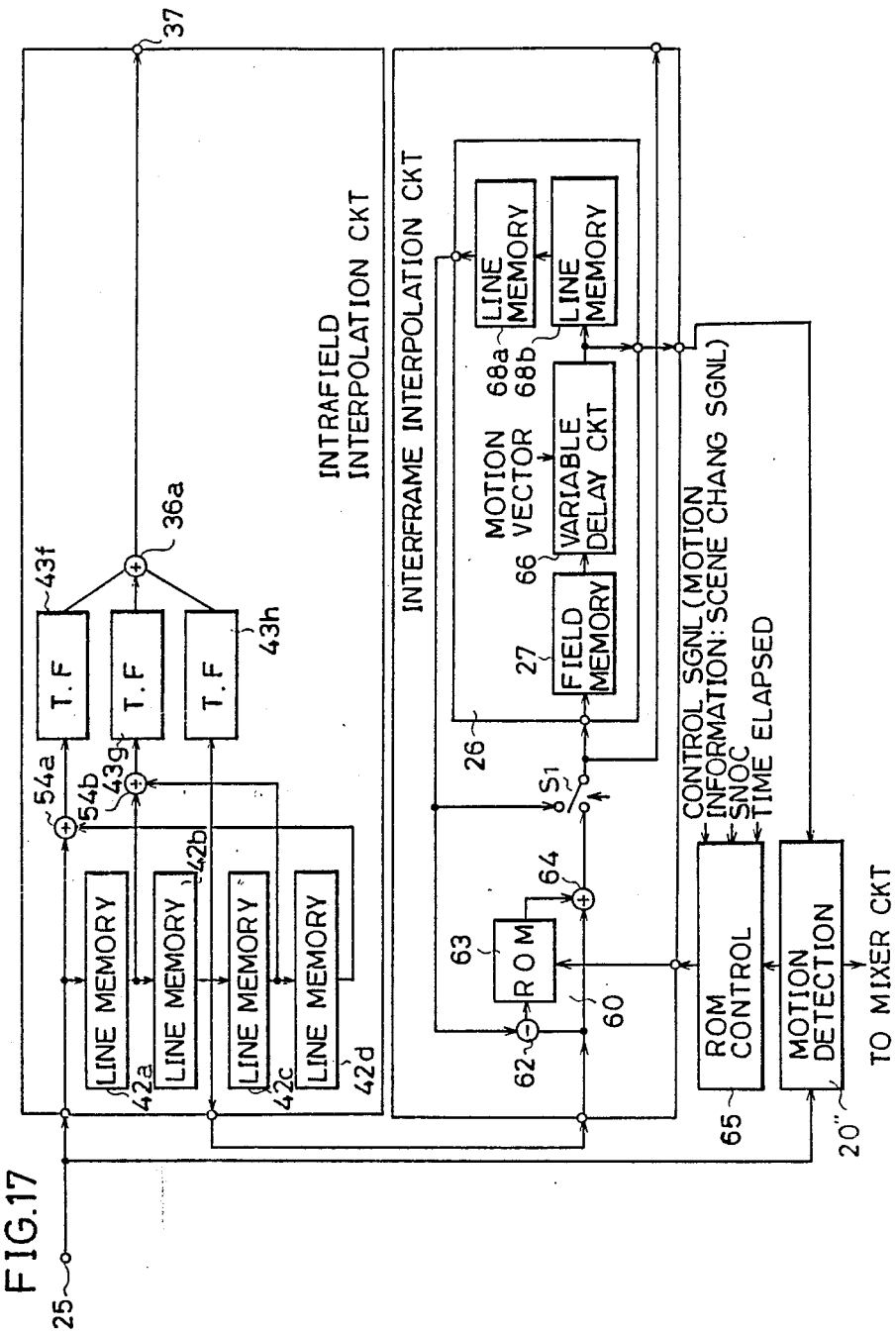

FIG. 17 shows the eighth embodiment of the present invention. Portions in this figure corresponding to those in the first to seventh embodiments are denoted with like reference designations. In this example, a recursive noise reduction is carried out on a signal of a still picture. A circuit shown in FIG. 17 comprises an intrafield interpolation circuit 18'', an interframe interpolation circuit 14'' and a recursive noise reduction circuit 60. The recursive noise reduction circuit is already known as shown in Japanese Patent Laying-Open No. 63-287270, for example, and hence only an outline thereof is described. The recursive noise reduction circuit comprises a subtracter 62, a ROM 63 and an adder 64. A ROM control circuit 65 controls input/output characteristics of this ROM 63, so that a mixing ratio of the noise reduction circuit is controlled in response to an input signal transmitted at that time. The ROM control circuit 65 operates responsive to motion information (bit numbers 16, 17, 18) detected by a reproduction of a control signal, noise reduction control information (bit numbers 11, 12), a SN ratio of a MUSE signal inputted at this time, a scene change (which is a time period elapsing from the time when a value of the motion information is "3"), and information of the amount of motion from a motion detecting circuit.

That is, the mixing ratio of the present frame signal is increased at the time of the scene change, at the time when there is a little noise, or at the time when little time has passed since the scene change, and in case of a motion portion. On the other hand, the mixing ratio of the signal two frames before is increased while an entire video is still, when there is more noise, or at the time when time has passed since the scene change, and in case of a still picture portion.

A time delay by approximately 2H period is caused in the motion detection in a motion detection circuit 20". Therefore, the signals in the present frame, and the signals one frame and two frames before are inputted through a terminal 25 and a variable delay circuit 66, respectively. A one field delay circuit 27 and the variable delay circuit 66 comprising a field memory are provided. This variable delay circuit 66 makes the read timing earlier by 2H period compared to the field memory 28 in FIG. 4. Line memories 68a and 68b each forming a 2H delay circuit are provided.

While the first to eighth embodiments take an example of two-dimensional intrafield interpolation in 5×7 order, it is noted that the present invention is not limitative to this.

According to the above described embodiments as described above, since the pixel signal one frame before which is unnecessary for interpolation need not be delayed by the line memories in the intrafield interpolation circuit for reproducing a motion picture, the capacities of the line memories can be reduced. That is, 960 pixels are present on one line at 32 MHz in the conventional. Assuming that 760 pixels out of 960 pixels are distributed to a Y signal and 200 pixels are distributed to a line sequential C signal, the capacity of a one line memory requires 1,160×8=9,280 bits for 1H of the Y signal and for 2H of the C signal, i.e. totally 37,120 bits for 4H. According to those embodiments, two line memories operating at 32 MHz and the other two line memories operating at 16 MHz are required, and consequently the memory capacity of totally 9,280×2+4,640×2=27,840 bits is required. This means that the memory capacity is reduced by 25%.

In addition, since the filter operation is carried out employing only the present frame pixels without 0 insertion in the intrafield interpolation processing, the required operation speed can be reduced from the conventional 32 MHz to 16 MHz. Therefore, a margin in the required time for the processing is increased, and especially the multipliers comprising ROMs can operate at half the speed compared to the conventional, resulting in an enhancement in its reliability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A picture signal interpolation device (43a) responsive to pixel signals sampled based on interline offset subsampling for interpolating a pixel signal between said sampled pixel signals, comprising:

m (m is an integer of 2 or more) cascaded delay means (33h, 33i, 33j) responsive to a predetermined clock signal for delaying said sampled pixel signals;

(m+1) first multiplication means (34a, 34b, 34c, 34d) connected to receive (m+1) pixel signals delayed from said delay means for multiplying each of the (m+1) pixel signals by a predetermined first tap coefficient;

first addition means (46) connected to outputs of said first multiplication means for adding output signals of said first multiplication means;

second multiplication means (34e, 34f, 34g) connected to receive the first or latter m pixel signals delayed from said delay means for multiplying each of the received pixel signals by a predetermined second tap coefficient;

second addition means (47) connected to outputs of said second multiplication means for adding output signals from said second multiplication means;

timing control means (33h, 33i, 33j, 58, S7) responsive to a position of said pixel signal to be interpolated for relatively controlling output timing of said first addition means and that of said second addition means; and mixing means (S5a) responsive to said clock signal for mixing output signals of said first and second addition means timing-controlled by said timing control means.

2. The pixel signal interpolation device in accordance with claim 1, wherein said second multiplication means are connected to receive said first delayed m pixel signals; and said timing control means comprises selective delay means (58, S7) connected to an output of said second addition means for selectively delaying an output signal from said second delay means in response to the position of said pixel signal to be interpolated.

3. The pixel signal interpolation device in accordance with claim 1, wherein said pixel signals sampled based on the interline offset subsampling include pixel signals sampled based on Multiple Sub-nyquist Sampling Encoding (MUSE).

4. The pixel signal interpolation device in accordance with claim 1, wherein said mixing means comprises switching means responsive to said clock signal for selectively outputting either the output signal of said first addition means or that of said second addition means, which is timing-controlled by said timing control means.

5. The pixel signal interpolation device in accordance with claim 1, wherein said timing control means comprises selection means (S4a, S4b, S4c) connected to receive the (m+1) pixel signals delayed from said delay means for selecting the first or latter m pixel signals out of said delayed (m+1) pixel signals in response to the position of said pixel signal to be interpolated; and said second multiplication means receives said m pixel signals through said selection means.

6. The pixel signal interpolation device in accordance with claim 5, wherein said selective delay means comprises a delay type flip flop (58) connected to receive the output signal from said second addition means, and switching means (S7) connected between an input and an output of said flip flop for being operative in response to the position of said pixel signal to be interpolated.

7. A pixel signal interpolation device (43a) responsive to pixel signals sampled based on interline offset subsampling for interpolating a pixel signal between said sampled pixel signals, comprising:

m (m is an integer of 2 or more) cascaded delay means (33h, 33i, 33j) for delaying said sampled pixel signals in response to a predetermined clock signal;

(m+1) first multiplication means (34a, 34b, 34c, 34d) connected to receive (m+1) pixel signals delayed from said delay means for multiplying each of the (m+1) pixel signals by a predetermined first tap coefficient;

first addition means (46) connected to outputs of said first multiplication means for adding output signals of said first multiplication means;

selection means (S4a, S4b, S4c) connected to receive the (m+1) pixel signals delayed from said delay means for selecting the first or last m pixel signals out of said delayed (m+1) pixel signals in response to a position of said pixel signal to be interpolated;

m second multiplication means (34e, 34f, 34g) connected to outputs of said selection means for multiplying each of the m pixel signals selected by said selection means by a predetermined second tap coefficient;

second addition means (47) connected to outputs of said second multiplication means for adding output signals from said second multiplication means; and mixing means (S5a) connected to outputs of said first and second addition means for mixing output signals from said first and second addition means in response to said clock signal.

8. The pixel signal interpolation device in accordance with claim 7, wherein said selection means comprises m first switching means (S4a, S4b, S4c) each connected between an input and an output of each of said m delay means for operating responsive to the position of said pixel signal to be interpolated, and each of said second addition means is connected to an output of each of said first switching means.

9. The pixel signal interpolation device in accordance with claim 7, wherein said mixing means comprises second switching means (S5a) connected between the outputs of said first and second addition means and alternately switching for the first half period and the latter half period of a period of said clock signal.

10. The pixel signal interpolation device in accordance with claim 7, wherein said pixel signals sampled based on the interline offset subsampling include pixel signals sampled based on Multiple Sub-nyquist Sampling Encoding (MUSE).

11. A MUSE decoder for decoding pixel signals sampled based on Multiple Sub-nyquist Sampling Encoding (MUSE), and alternately receiving pixel signals each constituting at least two frames for forming one picture, said MUSE decoder comprising:

interframe interpolation means (14) for interpolating pixel signals constituting a previous frame between pixel signals constituting a present frame on a horizontal scanning line;

removing means (40) connected to an output of said interframe interpolation means for removing the pixel signals in said previous frame, interpolated by said interframe interpolation means; and pixel signal interpolation means (43a) connected to an output of said removing means for interpolating pixel signals to be interpolated between the remaining pixel signals in response to the remaining pixel signals in said present frame; wherein said pixel signal interpolation means comprises m (m is an integer of 2 or more) cascaded delay means (33h, 33i, 33j) for delaying said remaining pixel signals, (m+1) first multiplication means (34a, 34b, 34c, 34d) connected to receive (m+1) pixel signals delayed by said delay means for multiplying each of the (m+1) pixel signals by a predetermined first tap coefficient, first addition means (46) connected to outputs of said first multiplication means for adding output signals of said first multiplication means, selection means (S4a, S4b, S4c) connected to receive the (m+1) pixel signals delayed by said delay means for selecting the first or latter m pixel signals out of said delayed (m+1) pixel signals in response to positions of said pixel signals to be interpolated, m second multiplication means (34e, 34f, 34g) connected to outputs of said selection means for multiplying each of the m pixel signals selected by said selection means by a predetermined second tap coefficient, second addition means (47) connected to outputs of said second multiplication means for adding output signals from said second multiplication means, and mixing means (S5a) connected to outputs of said first and second addition means for mixing output signals from said first and second addition means in response to said clock signal.

12. The MUSE decoder in accordance with claim 11, wherein said selection means comprises m first switching means (S4a, S4b, s4c) connected between an input and an output of each said m delay means for operating responsive to the positions of said pixel signals to be interpolated, and each of said second addition means is connected to an output of each of said first switching means.

13. The MUSE decoder in accordance with claim 11, wherein said mixing means comprises second switching means (S5a) connected between the outputs of said first and second addition means and alternately switching for the first half period and the latter half period of a period of said clock signal.

14. The MUSE decoder in accordance with claim 11, wherein said removing means comprises holding means (40) connected to the output of said interframe interpolation means for selectively holding only pixel signals in the present frame, and timing control means (41) connected to an output of said holding means for timing controlling the pixel signals held by said holding means between the horizontal scanning lines.

15. The MUSE decoder in accordance with claim 14, wherein said holding means comprises a first latch circuit (40), and said timing control means comprises a second latch circuit (41).

16. A MUSE decoder for decoding pixel signals sampled based on Multiple Sub-nyquist Sampling Encoding (MUSE), comprising:

distribution means (40, 41, 42a–42d) connected to receive said sampled pixel signals for distributing said sampled pixel signals on n (n is an integer of 2 or more) horizontal scanning lines constituting one picture; and n pixel signal interpolation means (43a–43e) connected to each of said distribution means for interpolating pixel signals to be interpolated between the sampled pixel signals on one horizontal scanning line; wherein said pixel signal interpolation means each comprises m (m is an integer of 2 or more) cascaded delay means (33h, 33i, 33j) responsive to a predetermined clock signal for delaying the sampled pixel signals distributed by said distribution means, (m+1) first multiplication means (34a, 34b, 34c, 34d) connected to receive (m+1) pixel signals delayed by said delay means for multiplying each of the (m+1) pixel signals by a predetermined first tap coefficient, first addition means (46) connected to outputs of said first multiplication means for adding output signals of said first multiplication means, selection means (S4a, S4b, S4c) connected to receive the (m+1) pixel signals delayed by said delay means for selecting the first or latter m pixel signals out of said delayed (m+1) pixel signals in response to positions of said pixel signals to be interpolated, m second multiplication means (34e, 34f, 34g) connected to outputs of said selection means for multiplying each of the m pixel signals selected by said selection means by a predetermined second tap coefficient, second addition means (47) connected to outputs of said second multiplication means for adding output signals from said second multiplication means, and mixing means (S5a) connected to outputs of said first and second addition means for mixing output signals from said first and second addition means in response to said clock signal.

17. The MUSE decoder in accordance with claim 16, wherein said selection means is further controlled responsive to a position on the horizontal scanning line processed by said pixel signal interpolation means in which said selection means are provided.

18. The MUSE decoder in accordance with claim 16, wherein said distribution means comprises (n−1) line memory means (42a–42d) connected between two of said pixel signal interpolation means provided adjacently.

* * * * *